(12) United States Patent
Ye et al.

(10) Patent No.: US 12,508,866 B2
(45) Date of Patent: Dec. 30, 2025

(54) THERMAL MANAGEMENT COMPONENT

(71) Applicant: ZHEJIANG SANHUA AUTOMOTIVE COMPONENTS CO., LTD., Zhejiang (CN)

(72) Inventors: Keli Ye, Zhejiang (CN); Fengyan Xu, Zhejiang (CN); Linzhong Wu, Zhejiang (CN); Zhengyi Yin, Zhejiang (CN); Bin Song, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 212 days.

(21) Appl. No.: 18/152,944

(22) PCT Filed: Jul. 23, 2021

(86) PCT No.: PCT/CN2021/108075
§ 371 (c)(1),
(2) Date: Jan. 11, 2023

(87) PCT Pub. No.: WO2022/022407
PCT Pub. Date: Feb. 3, 2022

(65) Prior Publication Data
US 2023/0339284 A1   Oct. 26, 2023

(30) Foreign Application Priority Data

Jul. 25, 2020  (CN) .......................... 202010726751.7
Jul. 25, 2020  (CN) .......................... 202010726752.1

(51) Int. Cl.
*B60H 1/00* (2006.01)
*B60H 1/32* (2006.01)
(Continued)

(52) U.S. Cl.
CPC ....... *B60H 1/00342* (2013.01); *B60H 1/3229* (2013.01); *B60K 11/02* (2013.01);
(Continued)

(58) Field of Classification Search
CPC .............. B60H 1/00342; B60H 1/3229; B60H 1/00278; B60H 2001/00307; B60K 11/02;
(Continued)

(56) References Cited

U.S. PATENT DOCUMENTS 2,013,186 A * 9/1935 Price .......................... F28D 7/06
165/DIG. 356
2,566,310 A * 9/1951 Burns ..................... F28F 3/025
165/157

(Continued)

FOREIGN PATENT DOCUMENTS

CN  200950012 Y   9/2007
CN  101666567 A   3/2010
(Continued)

OTHER PUBLICATIONS

Translation of the Written Opinion of the International Searching Authority for PCT/CN2021/108075; prepared Oct. 21, 2021. (Year: 2021).*

(Continued)

*Primary Examiner* — Ljiljana V. Ciric
(74) *Attorney, Agent, or Firm* — Ohlandt, Greeley and Perle, LLP.

(57) ABSTRACT

A thermal management component in a thermal management system. The thermal management component has a first connecting port, a second connecting port, and a third connecting port and includes a first valve portion, a liquid storage portion, and a plate heat exchange assembly. The first valve portion is located between a fourth connecting port and a fifth connecting port. The first connecting port is
(Continued)

in communication with an inlet of the liquid storage portion. The plate heat exchange assembly is located downstream from the liquid storage portion. The plate heat exchange assembly is in communication with the second connecting port and the third connecting port, and the second connecting port and the third connecting port are outlets.

16 Claims, 26 Drawing Sheets

(51) Int. Cl.
  *B60K 11/02* (2006.01)
  *B60K 11/04* (2006.01)
  *F25B 5/00* (2006.01)
  *F25B 6/00* (2006.01)
  *F25B 40/00* (2006.01)
  *F25B 41/40* (2021.01)
  *F28F 9/02* (2006.01)

(52) U.S. Cl.
  CPC ............ *F25B 41/40* (2021.01); *F28F 9/0253* (2013.01); *B60H 1/00278* (2013.01); *B60H 2001/00307* (2013.01); *B60K 11/04* (2013.01); *F25B 5/00* (2013.01); *F25B 6/00* (2013.01); *F25B 40/00* (2013.01); *F25B 2500/18* (2013.01)

(58) Field of Classification Search
  CPC . B60K 11/04; F25B 41/40; F25B 5/00; F25B 6/00; F25B 40/00; F25B 2500/18; F28F 9/0253
  USPC .................................................. 165/166, 167
  See application file for complete search history.

(56) References Cited

U.S. PATENT DOCUMENTS

| | | | | | |
|---|---|---|---|---|---|
| 3,098,522 | A | * | 7/1963 | Mccormick | F02C 7/08 165/166 |
| 3,310,105 | A | * | 3/1967 | Butt | F28D 9/0068 165/DIG. 387 |
| 3,372,453 | A | * | 3/1968 | Butt | F28F 11/00 29/402.13 |
| 3,461,956 | A | * | 8/1969 | Otto | G05D 23/023 165/DIG. 373 |
| 3,925,167 | A | * | 12/1975 | Rodgers | B01D 1/26 202/206 |
| 4,011,905 | A | * | 3/1977 | Millard | F28F 3/042 165/41 |
| 4,081,025 | A | * | 3/1978 | Donaldson | F28F 3/04 165/140 |
| 4,096,910 | A | * | 6/1978 | Coffinberry | F28D 7/106 165/81 |
| 4,330,308 | A | * | 5/1982 | Grenier | F25J 5/002 165/166 |
| 4,341,601 | A | * | 7/1982 | Hartig | B01D 1/22 159/49 |
| 4,932,467 | A | * | 6/1990 | Wigmore | F28F 27/02 165/DIG. 126 |
| 5,832,736 | A | * | 11/1998 | Yoshioka | F28F 3/04 62/503 |
| 7,044,207 | B1 | * | 5/2006 | Guidat | F28D 9/0006 165/170 |
| 7,380,544 | B2 | * | 6/2008 | Raduenz | F28D 9/0056 165/166 |
| 7,753,105 | B2 | * | 7/2010 | Acre | B60H 1/3227 165/41 |
| 8,272,233 | B2 | * | 9/2012 | Yoshimura | F25B 40/00 62/515 |
| 8,596,339 | B2 | * | 12/2013 | Palanchon | F28D 9/0031 165/174 |
| 8,899,062 | B2 | * | 12/2014 | Kadle | B60H 1/00342 62/333 |
| 9,109,840 | B2 | * | 8/2015 | Kadle | B60H 1/32284 |
| 9,343,755 | B2 | * | 5/2016 | Vanderwees | H01M 8/0267 |
| 9,494,350 | B2 | * | 11/2016 | Kadle | F28F 3/08 |
| 9,528,772 | B2 | * | 12/2016 | Marold | F28D 9/0031 |
| 9,927,184 | B2 | * | 3/2018 | Fujita | F28D 9/0062 |
| 10,302,319 | B2 | * | 5/2019 | Seo | F25B 39/04 |
| 10,724,802 | B2 | * | 7/2020 | Courtial | F28F 9/0221 |
| 10,989,481 | B2 | * | 4/2021 | Crawford | F28D 9/0093 |
| 11,199,369 | B2 | * | 12/2021 | Vandermeer | B33Y 80/00 |
| 11,248,854 | B2 | * | 2/2022 | Greiciunas | F28F 7/02 |
| 11,359,868 | B2 | * | 6/2022 | Eldred | F28F 3/083 |
| 11,598,583 | B2 | * | 3/2023 | Schwalm | F28F 3/025 |
| 12,297,923 | B2 | * | 5/2025 | Gill | F16K 27/065 |
| 2009/0277606 | A1 | * | 11/2009 | Reiss, III | F28D 7/1692 165/69 |
| 2014/0262176 | A1 | * | 9/2014 | Min | F28D 9/02 165/166 |
| 2014/0373798 | A1 | * | 12/2014 | Alfano | F28F 9/22 126/263.02 |
| 2016/0169597 | A1 | * | 6/2016 | Nehlen, III | B01D 1/00 165/166 |
| 2020/0191416 | A1 | | 6/2020 | Okuda et al. | |
| 2022/0018553 | A1 | | 1/2022 | Akaiwa et al. | |
| 2023/0339284 | A1 | * | 10/2023 | Ye | B60K 11/02 |

FOREIGN PATENT DOCUMENTS

| | | | |
|---|---|---|---|
| CN | 205980446 U | 2/2017 | |
| CN | 108068572 A | 5/2018 | |
| CN | 110614895 A | 12/2019 | |
| EP | 3901536 B1 * | 12/2023 | ............ F25B 39/00 |
| JP | 2016-038830 A1 | 3/2016 | |
| JP | 2016-080463 A1 | 5/2016 | |
| WO | 2016-080463 A1 | 5/2016 | |
| WO | 2020129180 A1 | 6/2020 | |

OTHER PUBLICATIONS

Japanese Office Action (with English translation) dated Jan. 9, 2024 for Japanese Appl. No. 2023-501683.
International Search Report dated Oct. 21, 2021 for PCT Appl. No. PCT/CN2021/108075.
Korean Office Action (English translation) dated Jan. 16, 2025 for Korean Application No. 10-2023-7005904.

* cited by examiner

THERMAL MANAGEMENT COMPONENT

This disclosure is a national phase application of PCT international patent application No. PCT/CN2021/108075, filed on Jul. 23, 2021, which claims the benefit of priorities to the following two Chinese patent applications, both of which are incorporated herein by reference,
1) Chinese Patent Application No. 202010726752.1, titled "THERMAL MANAGEMENT COMPONENT", filed with the China National Intellectual Property Administration on Jul. 25, 2020; and
2) Chinese Patent Application No. 202010726751.7, titled "THERMAL MANAGEMENT COMPONENT", filed with the China National Intellectual Property Administration on Jul. 25, 2020.

FIELD

The present disclosure relates to the technical field of vehicle components, and in particular to a vehicular thermal management assembly.

BACKGROUND

A vehicle thermal management system includes an air conditioning system, a motor and a component thermal management system. For a new energy vehicle, the vehicle thermal management system further includes a battery pack thermal management system. There are many components in the thermal management system, the connection is complex, and the occupied space is large. A technical problem is how to design the connection relation among various components in the system while meet the functions of components so as to make the structure compact and facilitate the assembly.

SUMMARY

An object according to the present disclosure is to provide a thermal management assembly which has a compact structure and a convenient assembly.

In order to achieve the above object, the following technical solution is provided: a thermal management assembly, which is able to be applied to a vehicular thermal management system, includes a first connecting port, a second connecting port and a third connecting port, the thermal management assembly includes a liquid storage portion and a plate heat exchange assembly, the first connecting port is in communication with an inlet of the liquid storage portion or the first connecting port is configured as an inlet of the liquid storage portion, the plate heat exchange assembly is located downstream of the liquid storage portion; the plate heat exchange assembly is in communication with the second connecting port and the third connecting port, respectively, the second connecting port and the third connecting port are configured as outlets, or the second connecting port and the third connecting port are configured as outlets of the plate heat exchange assembly.

The thermal management assembly according to the present disclosure includes the liquid storage portion and the plate heat exchange assembly, the thermal management assembly is provided with a first connecting port, a second connecting port and a third connecting port, the liquid storage portion is integrated to an integral unit based on the plate heat exchange assembly, and multiple connecting ports which are connected to the system are provided, resulting in a more compact structure. The thermal management assembly is configured as an integrated structure when being assembled with a system, only pipelines of the system needs to be connected to the corresponding structures, which has a convenient assembly.

DETAILED DESCRIPTION OF THE EMBODIMENTS

Figure 1:
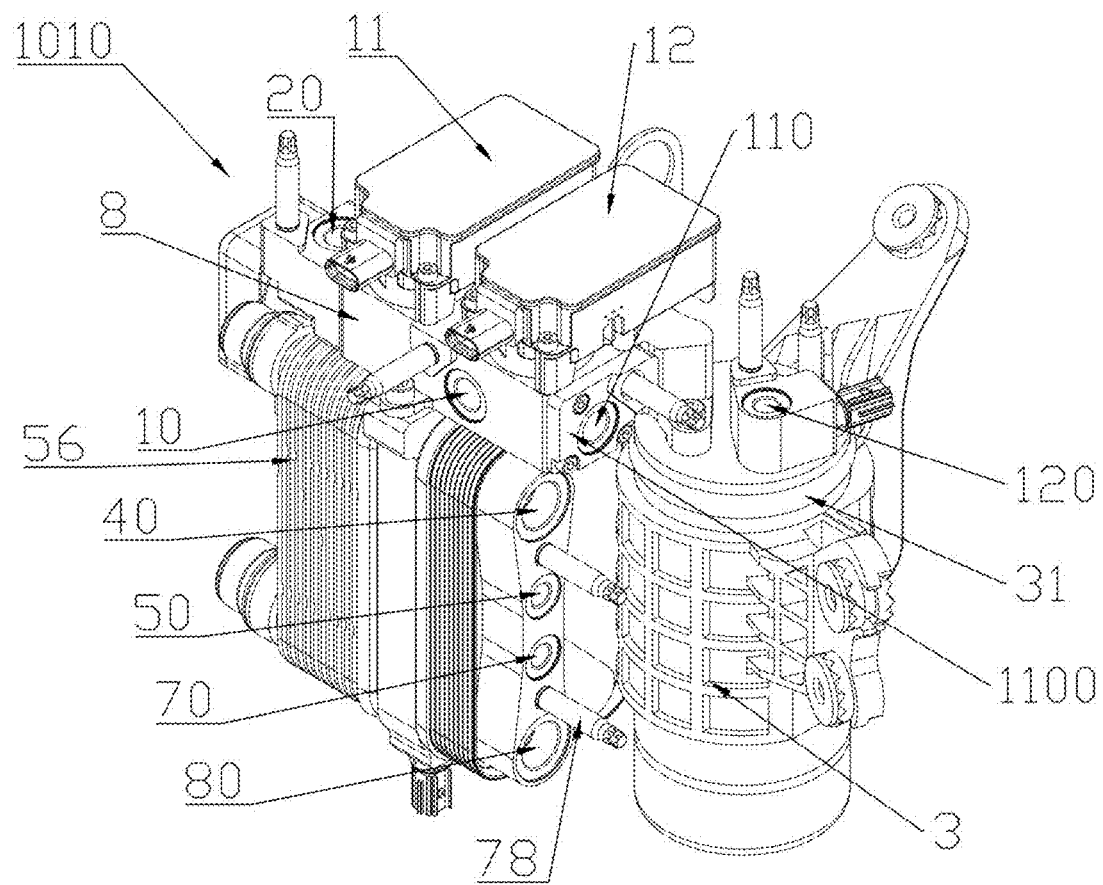
FIG. 1 is a schematic perspective view of a first embodiment of a thermal management assembly viewed from one perspective.
Figure 2:
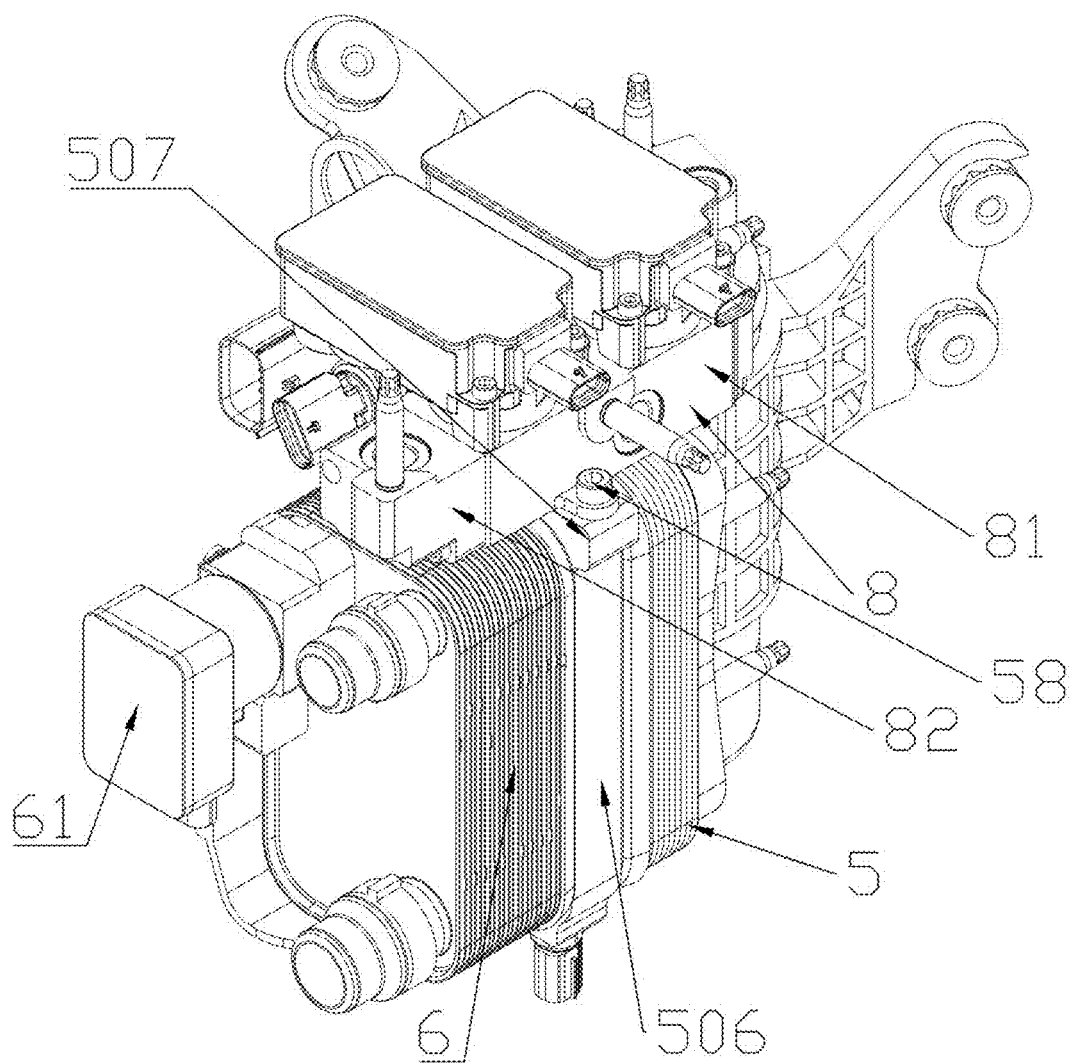
FIG. 2 is a schematic perspective view of the first embodiment of the thermal management assembly viewed from another perspective.
Figure 3:
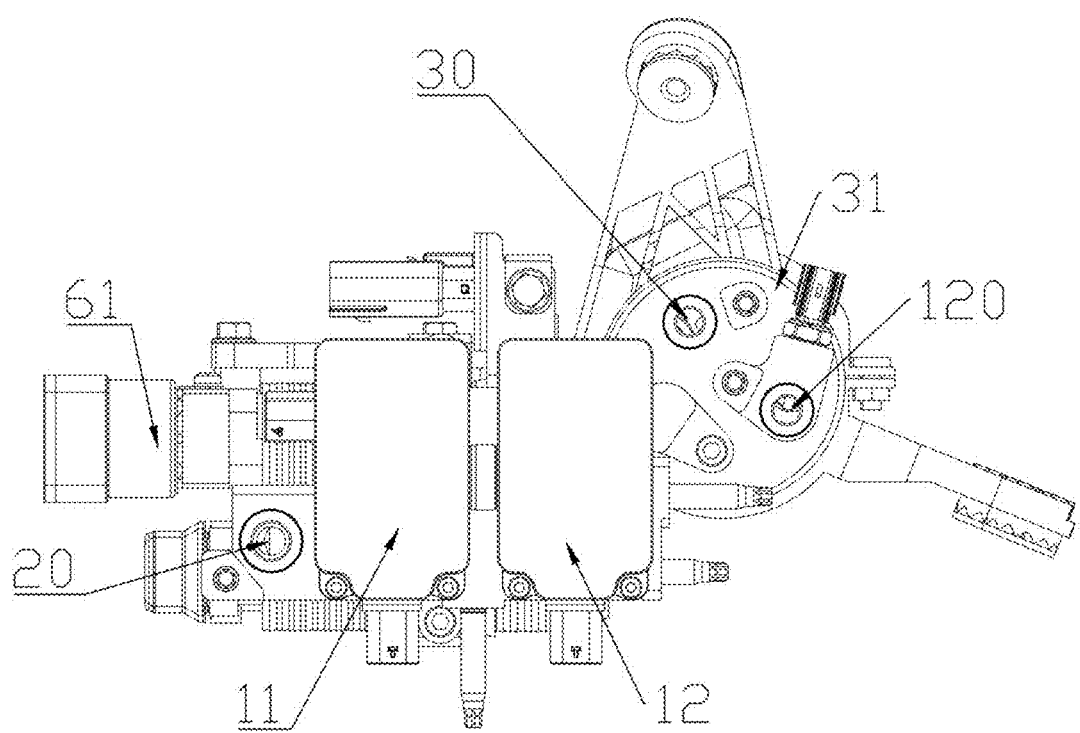
FIG. 3 is a schematic top view of the first embodiment of the thermal management assembly.
Figure 4:
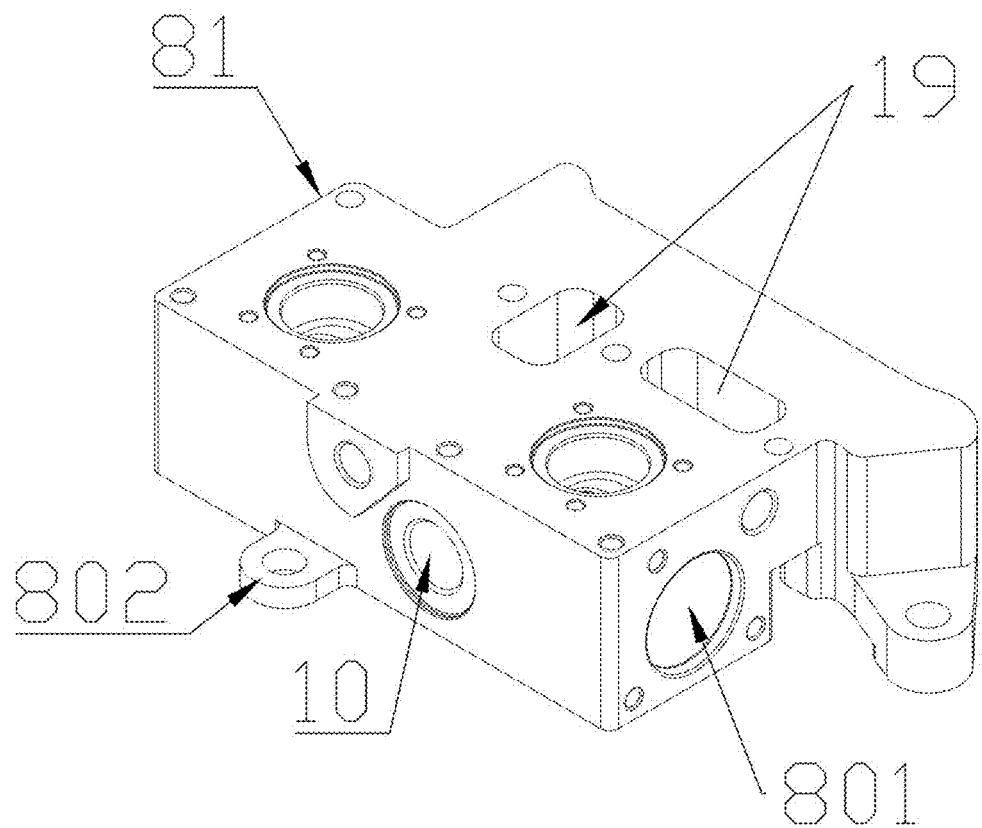
FIG. 4 is a schematic perspective view of a connecting portion of the thermal management assembly in FIG. 1 viewed from one perspective.

The present disclosure is further illustrated hereinafter in conjunction with drawings and specific embodiments.

Referring to FIGS. 1 to 23, a thermal management assembly according to the present disclosure can be applied to a vehicular thermal management system, the thermal management assembly has a fourth connecting port 10, a fifth connecting port 20, a first connecting port 30, a second connecting port 40 and a third connecting port 50, the thermal management assembly includes a first valve portion 11, a liquid storage portion 3 and a plate heat exchange assembly 56, the first valve portion 11 is located between the fourth connecting port 10 and the fifth connecting port 20, the first connecting port 30 is in communication with an inlet of the liquid storage portion 3, and the plate heat exchange assembly 56 is located downstream of the liquid storage portion 3. The plate heat exchange assembly 56 is in communication with the second connecting port 40 and the third connecting port 50, and the second connecting port 40 and the third connecting port 50 are configured as outlets; or the second connecting port 40 and the third connecting port 50 are configured as outlets of the plate heat exchange assembly 56. The thermal management assembly may further has a sixth connecting port 60, a seventh connecting port 70 and an eighth connecting port 80, the sixth connecting port is one inlet of the plate heat exchange assembly 56, one outlet of the plate heat exchange assembly 56 is in communication with the seventh connecting port 80, and one inlet of the plate heat exchange assembly 56 is in communication with the eighth connecting port 80. Specifically, the thermal management assembly further includes a first valve assembly 7, a first inlet 71 of the first valve assembly 7 and a first outlet 72 of the first valve assembly 7 are in communication with the plate heat exchange assembly 56, a second inlet 73 of the first valve assembly 7 is in communication with the eighth connecting port 80 or a second inlet 73 of the first valve assembly 7 forms the eighth connecting port 80, a second outlet 74 of the first valve assembly 7 is in communication with the seventh connecting port 70 or a second outlet 74 of the first valve assembly 7 forms the seventh connecting port 70. Alternatively, the first valve assembly 7 may not be provided, the seventh connecting port 70 is in communication with one inlet of the plate heat exchange assembly 56 through a passage, or the seventh connecting port 70 is configured as one inlet of the plate heat exchange assembly 56, and the eighth connecting port 80 is in communication with the plate heat exchange assembly 56 through a passage or the eighth connecting port 80 is configured as one outlet of the plate heat exchange assembly 56. The thermal management assembly may further include a second valve assembly 4, the second valve assembly 4 is located between the liquid storage portion 3 and the plate heat exchange assembly 56, an outlet of the liquid storage portion 3 is in communication with a first inlet of the second valve assembly 4, a twelfth connecting port 100 is in communication with a second inlet of the second valve assembly 4 or the twelfth connecting port 100 is configured as a second inlet of the second valve assembly 4, an eleventh connecting port 90 is in communication with a first outlet of the second valve assembly 4 or an eleventh connecting port 90 is configured as a first outlet of the second valve assembly 4, and a second outlet of the second valve assembly 4 is in communication with an inlet of the plate heat exchange assembly 56. The thermal management assembly may further include a second valve portion 12, the second valve portion 12 is located between the fourth connecting port 10 and a ninth connecting port 110, and a tenth connecting port 120 is in communication with a second inlet 33 of the liquid storage portion 3. Of course, the first valve portion and the second valve portion may not be provided if no pressure adjustment is needed.

The thermal management assembly according to the present disclosure can be applied to the vehicular thermal management system, the thermal management system may include a compressor, a condenser, an evaporator and the thermal management assembly, the fourth connecting port 10 of the thermal management assembly can be in communication with an outlet of the compressor, the second connecting port of the thermal management assembly can be in communication with an inlet of the compressor, the fifth connecting port of the thermal management assembly can be in communication with an inlet of the condenser, the first connecting port can be in communication with an outlet of the condenser, the sixth connecting port can be in communication with an outlet of the evaporator, and the third connecting port can be in communication with an inlet of the evaporator. Of course, the system may further include a second evaporator, the seventh connecting port 70 is in communication with an inlet of the second evaporator, and the eighth connecting port 80 is in communication with an outlet of the evaporator. The system may further include a subcooler, the eleventh connecting port 90 is in communication with an inlet of the subcooler, and twelfth connecting port 100 is in communication with an outlet of the subcooler. The system may further include a second condenser, the ninth connecting port 110 is in communication with an inlet of the second condenser, and the tenth connecting port is in communication with an outlet of the second condenser. The above vehicular thermal management system may be a new energy vehicular thermal management system, including a pure electric vehicular thermal management system.

FIGS. 1 to 5 are schematic views of a first embodiment of the thermal management assembly. In this embodiment, the thermal management assembly 1010 has a fourth connecting port 10, a fifth connecting port 20, a first connecting port 30, a second connecting port 40, a third connecting port 50, a seventh connecting port 70, an eighth connecting port 80, a ninth connecting port 110 and a tenth connecting port 120. The thermal management assembly 1010 includes a first valve portion 11, a second valve portion 12, a liquid storage portion 3, a plate heat exchange assembly 56 and a connecting portion 8, where the plate heat exchange assembly 56 includes an intermediate heat exchanger 5, a cooler 6 and an inner connecting bridge 506, the cooler 6 is provided with a refrigerant passage and a coolant passage, and the intermediate heat exchanger is in communication with the refrigerant passage of the cooler. The connecting portion 8 has a first duct 801, at least part of the first valve portion 11 is located in the first duct 801, the fourth connecting port 10 is in communication with the fifth connecting port 20 through the first duct 801, and the fourth connecting port 10 and the fifth connecting port 20 are formed on the connecting portion 8. In this embodiment, the connecting portion 8 is processed by a profile, the fourth connecting port faces a horizontal direction, and the fifth connecting port faces a vertical direction. In order to facilitate the processing of the first duct, the connecting portion 8 has a two separated structures, which are first portion 81 and second portion 82, and the first portion 81 is fixedly connected to the second portion 82. Alternatively, the connecting portion 8 may have an integral structure if other processing method, such as casting, is applied. The fourth connecting port 10 and the fifth connecting port 20 can be in communication through the cooperation of the first valve portion and the first duct and can adjust a pressure of a working medium in the first duct.

Figure 5:
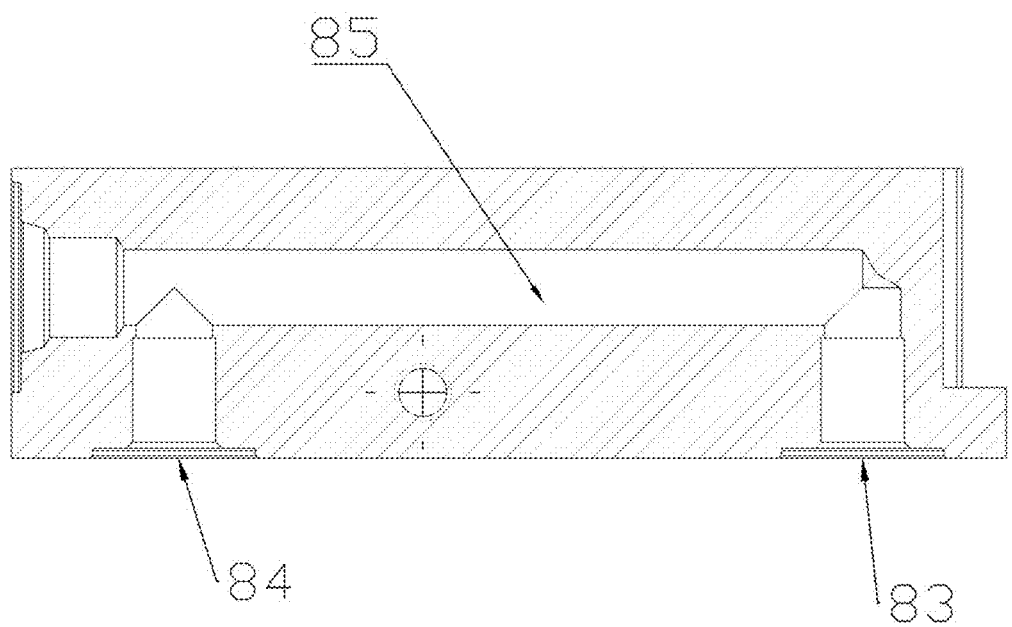
FIG. 5 is a schematic cross-sectional view of the connecting portion of the thermal management assembly in FIG. 1.
Figure 6:
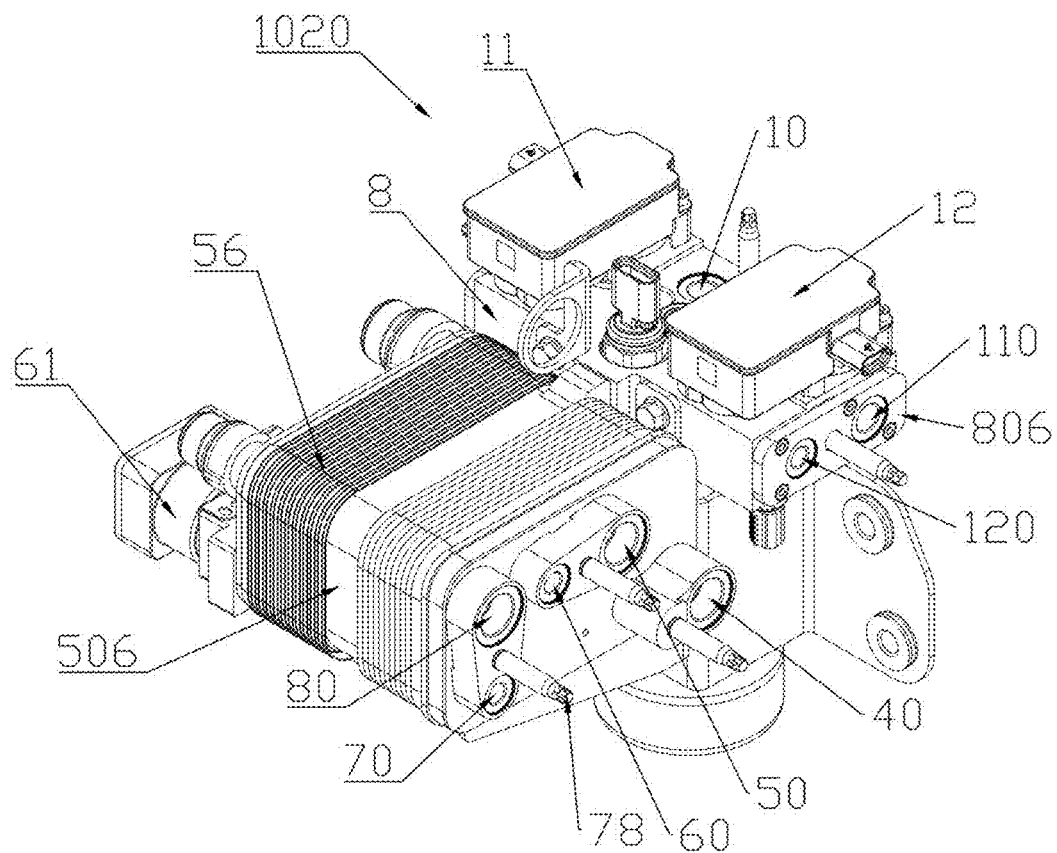
FIG. 6 is a schematic perspective view of a second embodiment of the thermal management assembly viewed from one perspective.
Figure 7:
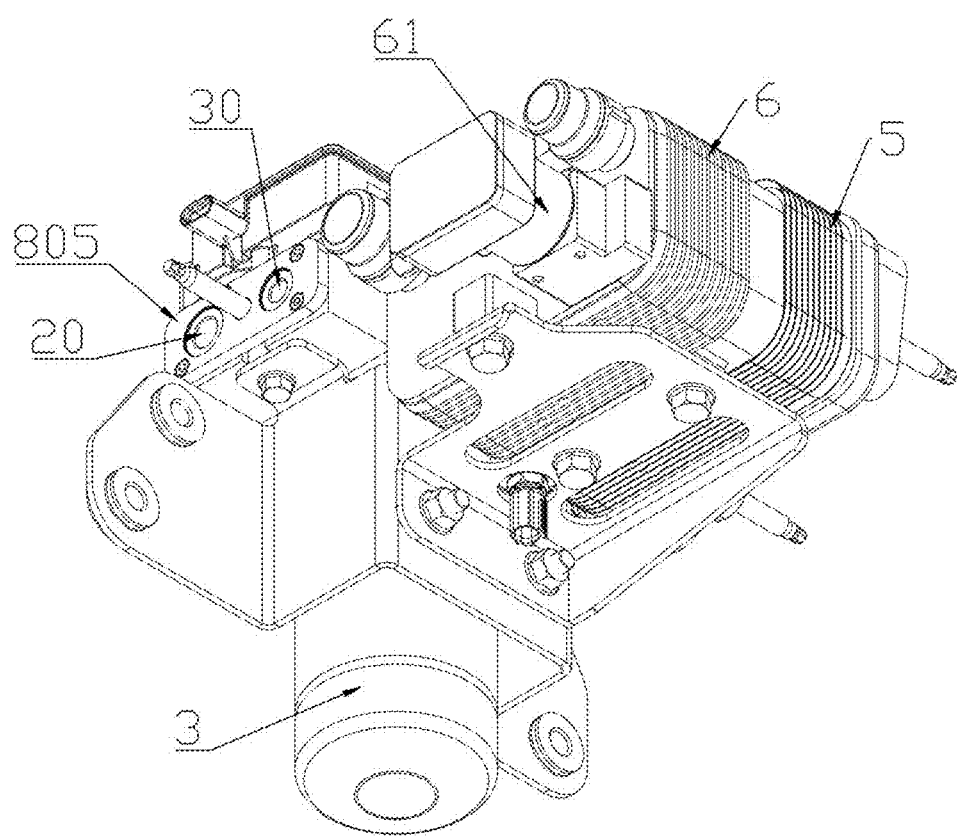
FIG. 7 is a schematic perspective view of the second embodiment of the thermal management assembly viewed from another perspective.
Figure 8:
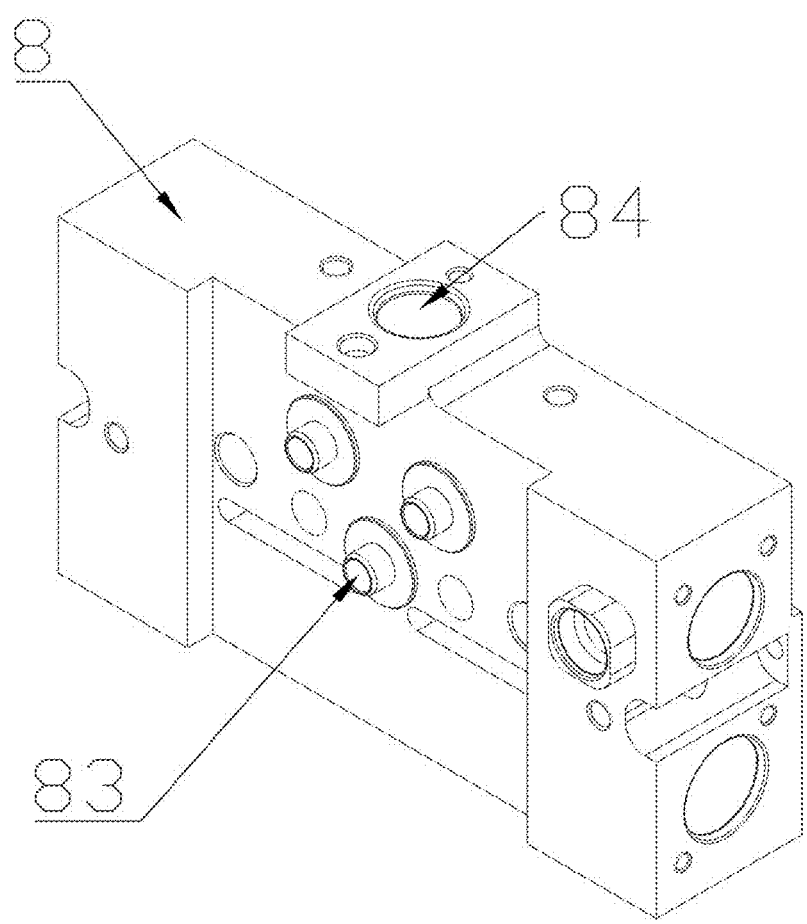
FIG. 8 is a schematic perspective view of the connecting portion of the thermal management assembly in FIG. 6 viewed from one perspective.
Figure 9:
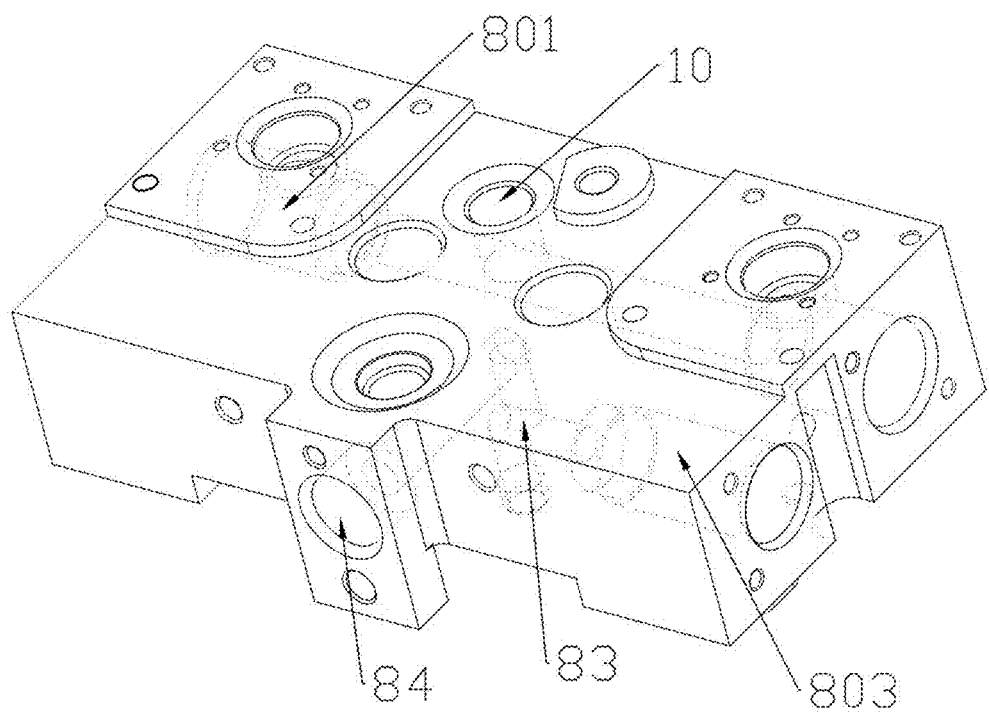
FIG. 9 is a schematic perspective view of the connecting portion of the thermal management assembly in FIG. 6 viewed from another perspective.
Figure 10:
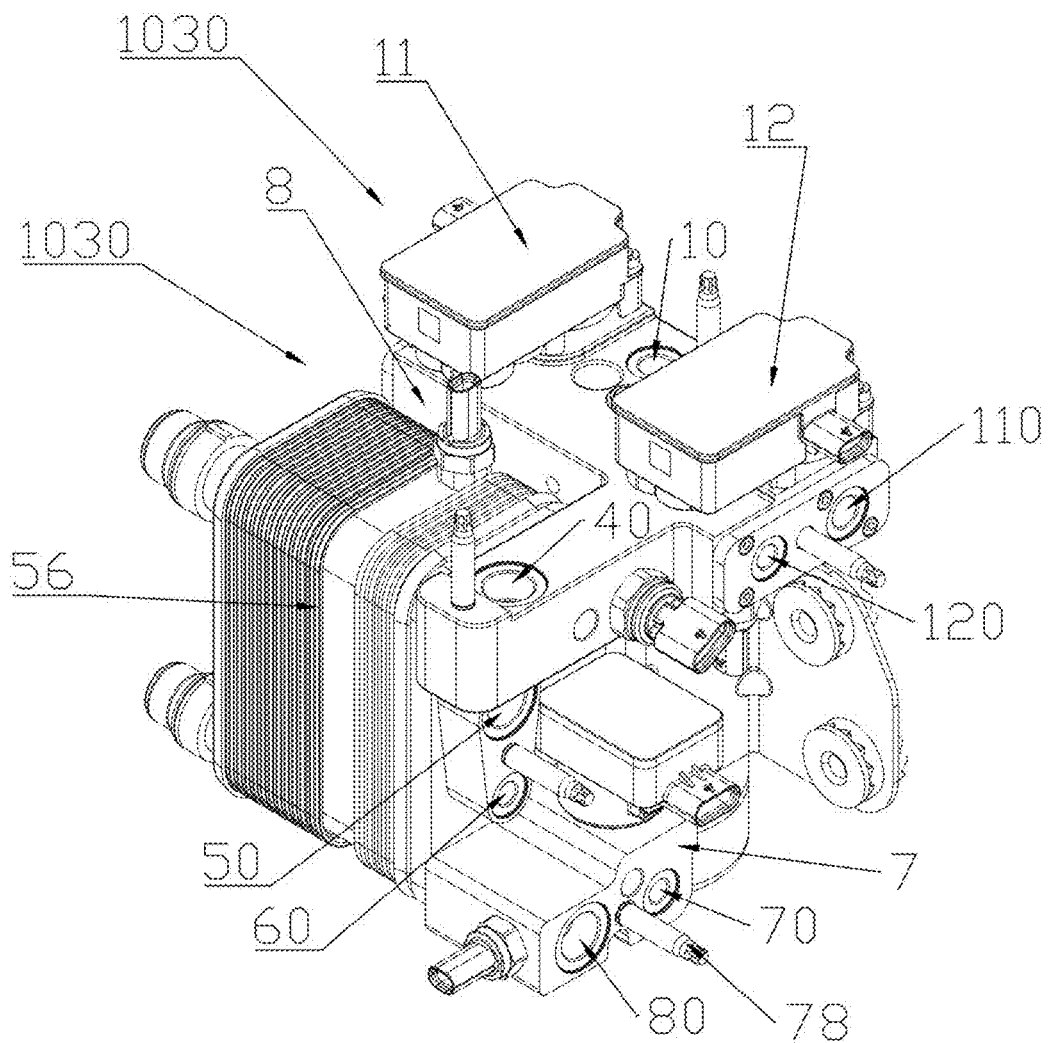
FIG. 10 is a schematic perspective view of a third embodiment of the thermal management assembly viewed from one perspective.
Figure 11:
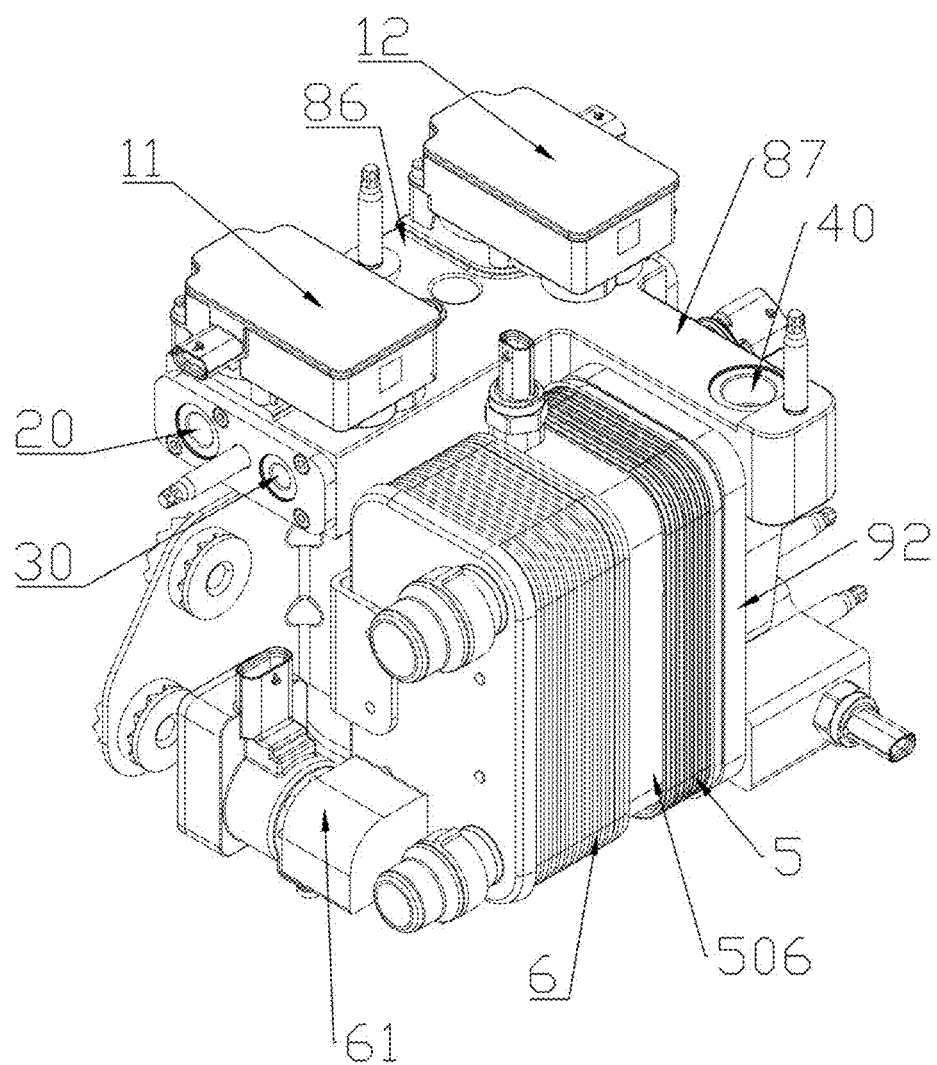
FIG. 11 is a schematic perspective view of the third embodiment of the thermal management assembly viewed from another perspective.
Figure 12:
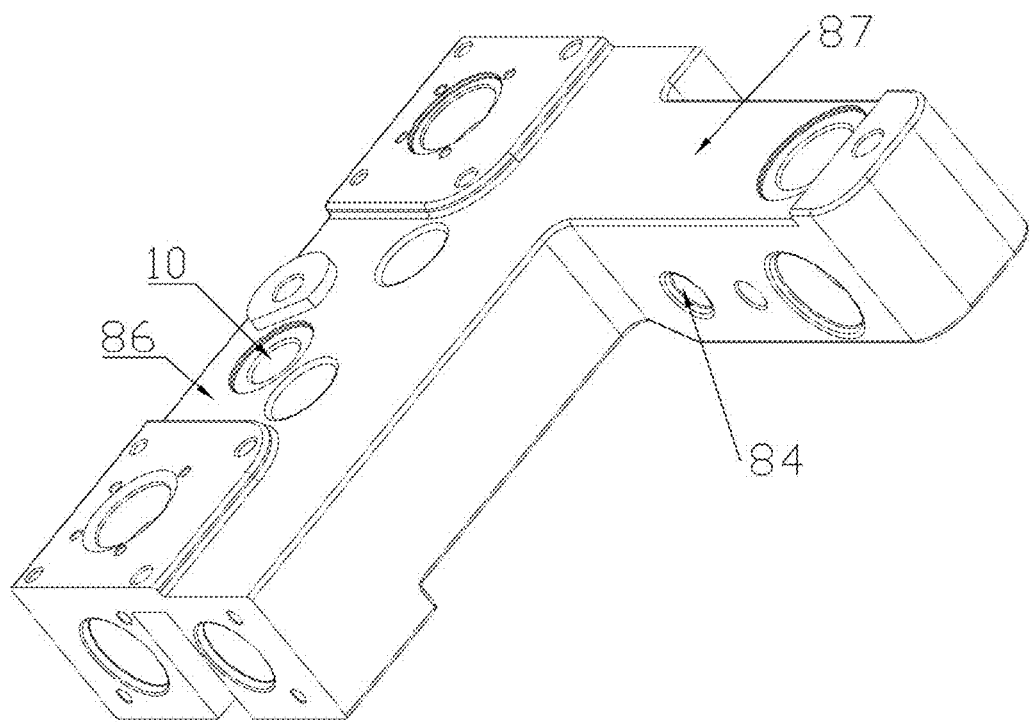
FIG. 12 is a schematic perspective view of the connecting portion of the thermal management assembly in FIG. 11.
Figure 13:
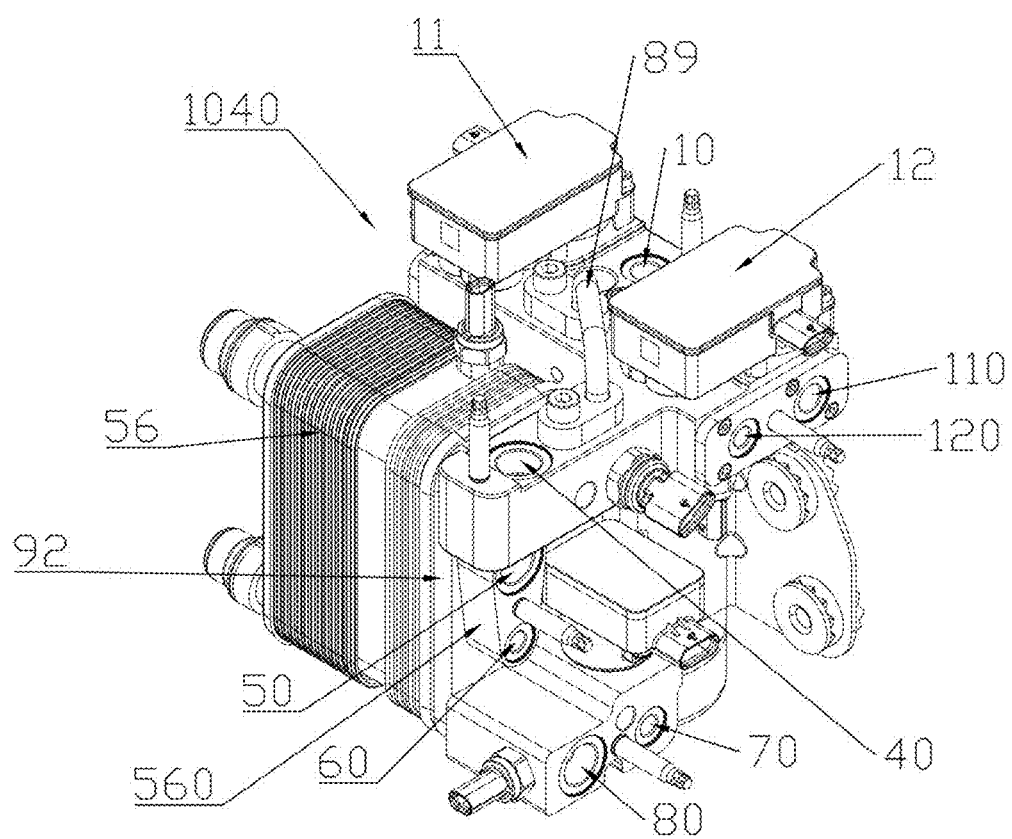
FIG. 13 is a schematic perspective view of a fourth embodiment of the thermal management assembly viewed from one perspective.
Figure 14:
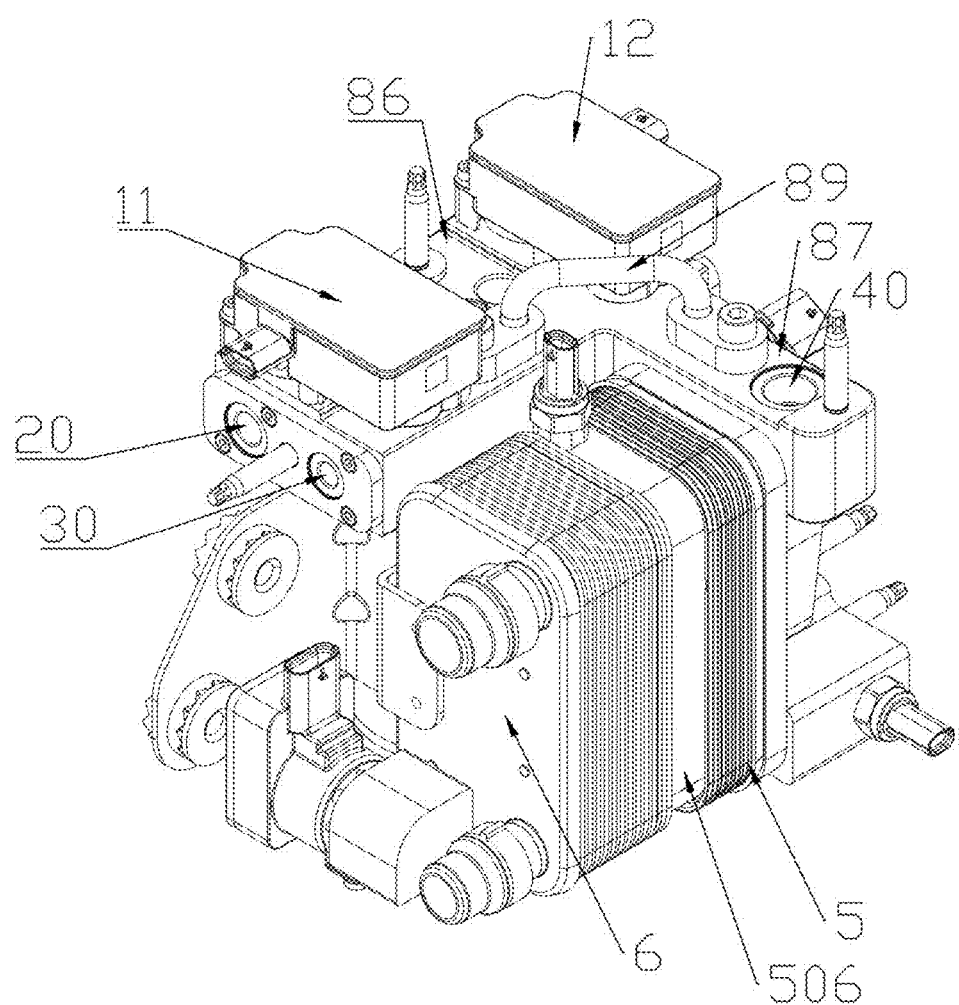
FIG. 14 is a schematic perspective view of the fourth embodiment of the thermal management assembly viewed from another perspective.
Figure 15:
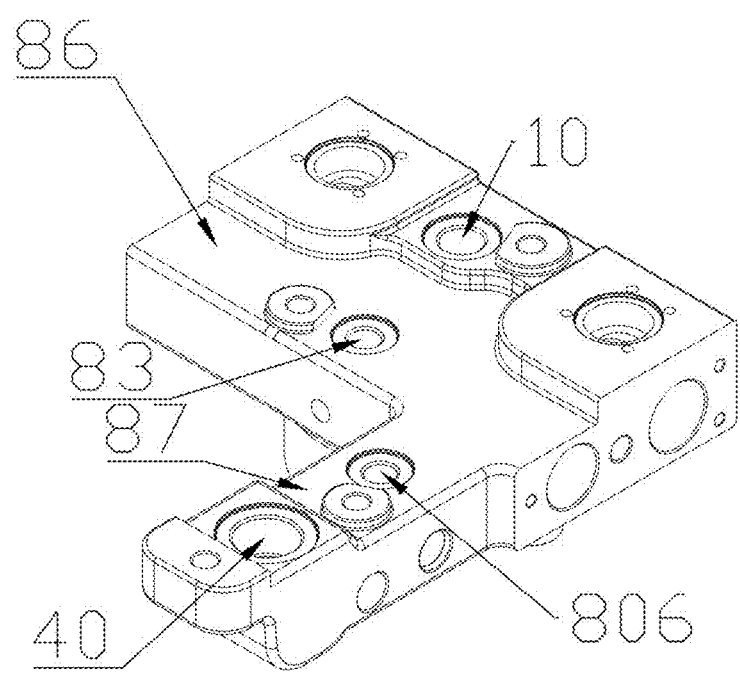
FIG. 15 is a schematic perspective view of the connecting portion of the thermal management assembly in FIG. 13 viewed from one perspective.
Figure 16:
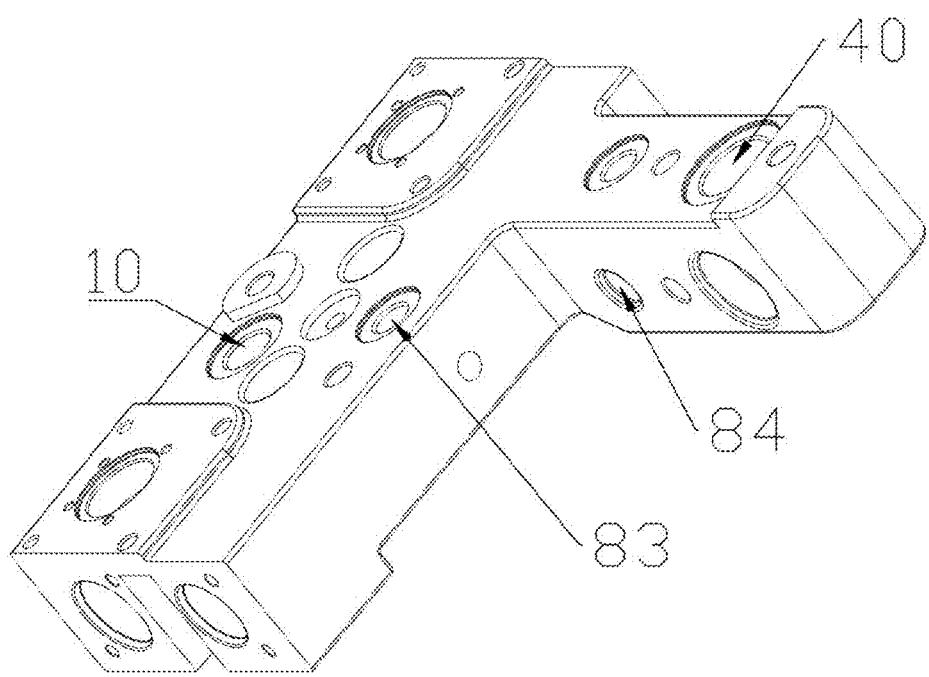
FIG. 16 is a schematic perspective view of the connecting portion of the thermal management assembly in FIG. 13 viewed from another perspective.
Figure 17:
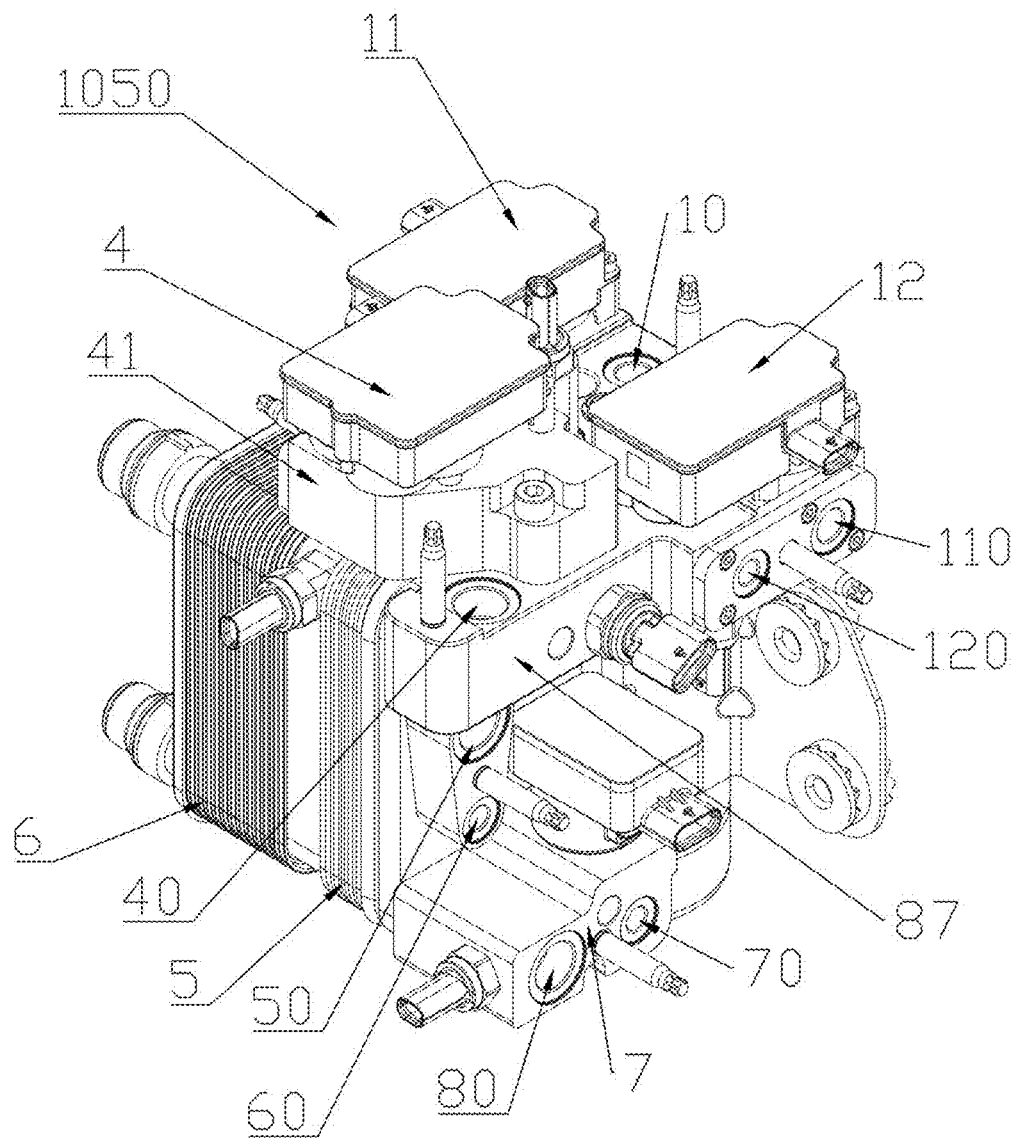
FIG. 17 is a schematic perspective view of a fifth embodiment of the thermal management assembly viewed from one perspective.
Figure 18:
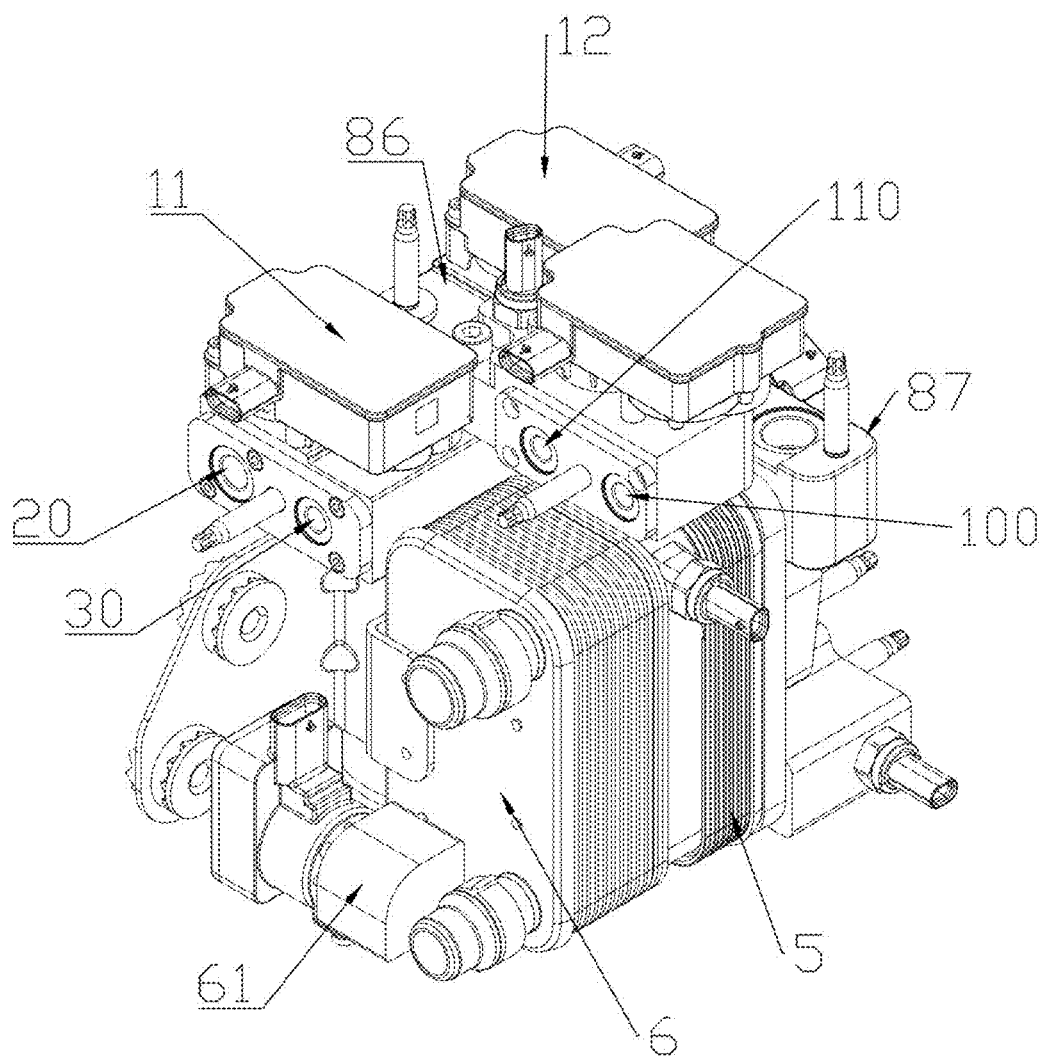
FIG. 18 is a schematic perspective view of the fifth embodiment of the thermal management assembly viewed from another perspective.
Figure 19:
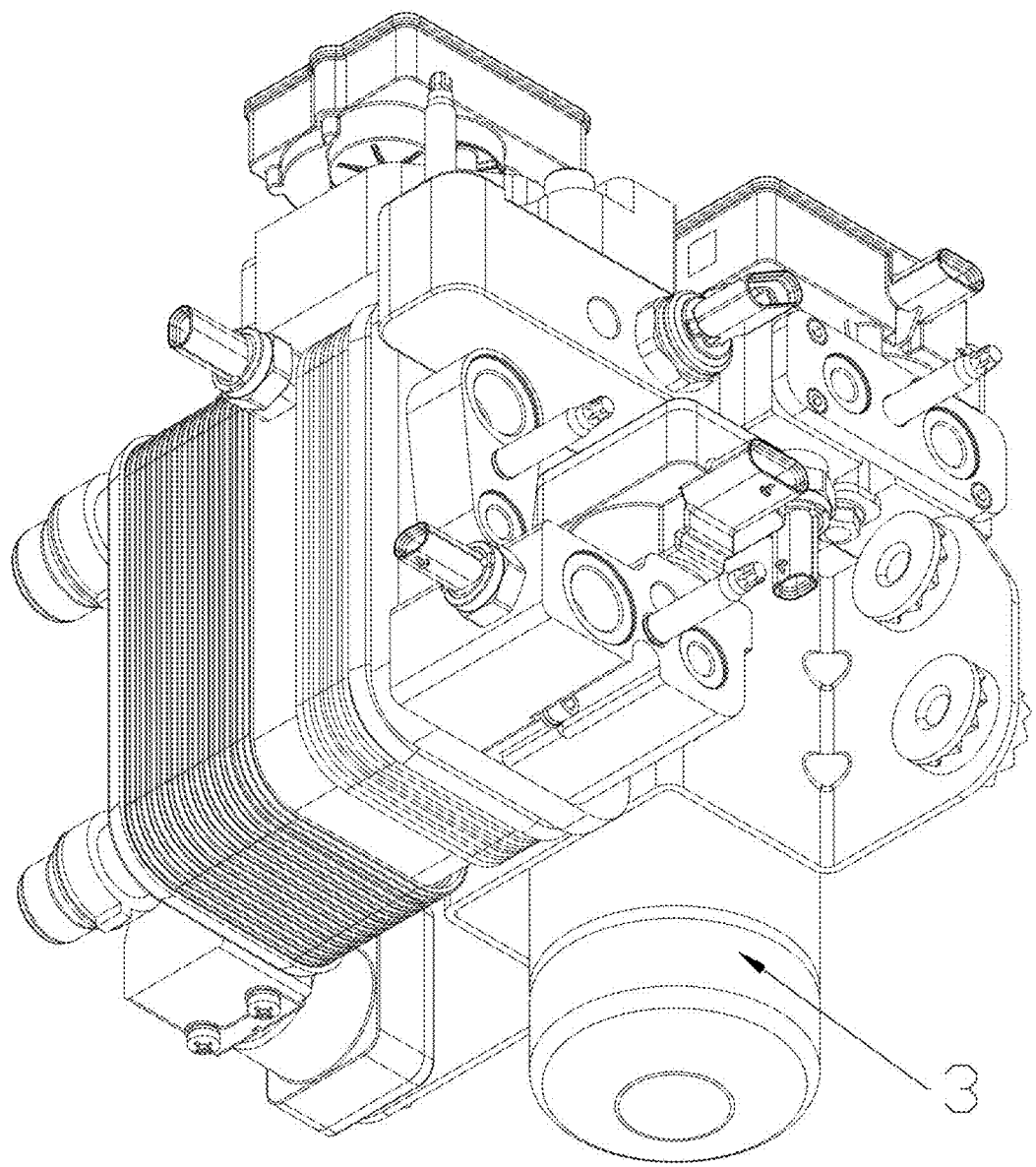
FIG. 19 is a schematic perspective view of the fifth embodiment of the thermal management assembly viewed from a third perspective.
Figure 20:
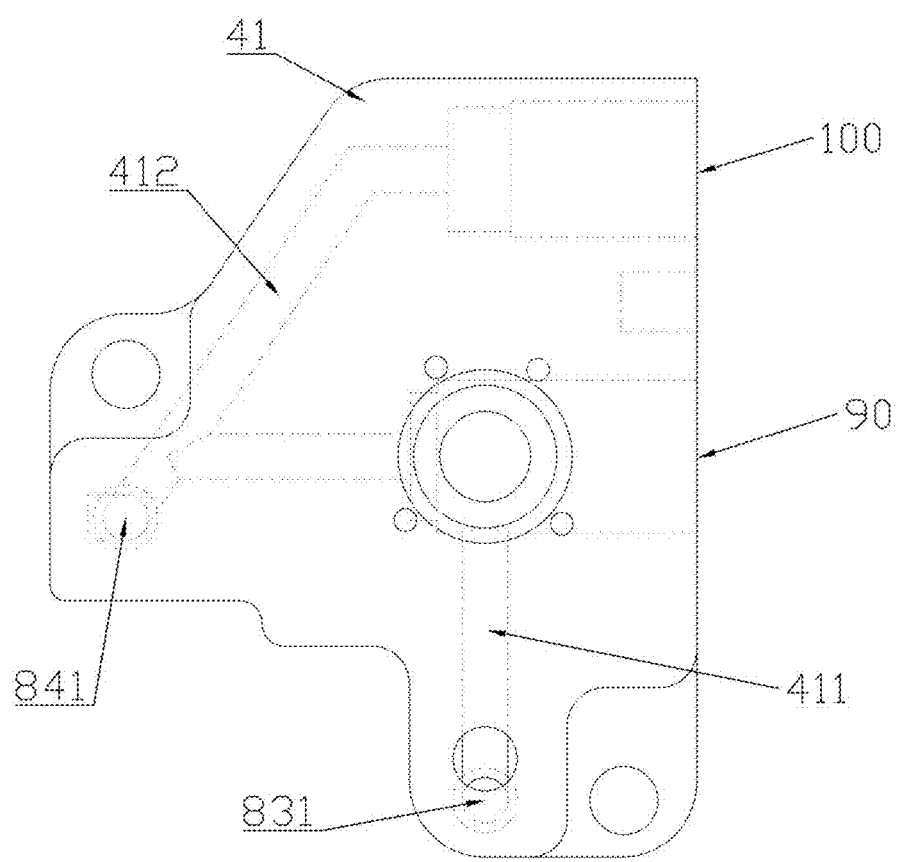
FIG. 20 is a schematic perspective view of a second valve assembly of the thermal management assembly in FIG. 18.

The connecting portion 8 has a liquid storage portion connecting port 83, a heat exchange portion connecting port 84 and a second transition passage 85, the liquid storage portion connecting port 83 is in communication with the heat exchange portion connecting port 84 through the second transition passage 85, an outlet of the liquid storage portion 3 is in communication with the liquid storage portion connecting port 83, and the heat exchange portion connecting port 84 is in communication with an inlet of the plate heat exchange assembly 56. In this embodiment, since the plate heat exchange assembly 56 includes the intermediate heat exchanger 5, the cooler 6, and the inner connecting bridge 506, the inner connecting bridge 506 is located between the intermediate heat exchanger 5 and the cooler 6, the inlet of the plate heat exchange assembly 56 is located on the inner connecting bridge 506, that is, the heat exchange portion connecting port 84 is in communication with the inner connecting bridge 506, the heat exchange portion connecting port 84 is located on a bottom of the connecting portion 8 (as shown in FIG. 5), and a top of the inner connecting bridge 506 is provided with a through hole that is in communication with the heat exchange portion connecting port 84. In order to ensure the connection reliability of the connecting portion and the inner connecting bridge, the plate heat exchange assembly further includes a connecting screw 58, the connecting portion 8 forms a connecting flange 802, the inner connecting bridge 506 forms a protrusion 507, and the connecting flange 802 is threaded to the protrusion 507 by threading the connecting screw 58 through a through hole of the connecting flange 802. Alternatively, other connection method, such as welding, may be used. The plate heat exchange assembly further includes a throttle element 61, the throttle element may be an electronic expansion valve, the throttle element 61 is located at a free end of the cooler 6, and the free end is defined with respect to a connecting end of the intermediate heat exchanger 5. A working medium flowing into the inner connecting bridge from the heat exchange portion connecting port 84 flows into the intermediate heat exchanger, the working medium in the intermediate heat exchanger is divided into a first group, a second group and a third group, the first group flows into the cooler 6 from the throttle element 61, the working medium in the second group is in communication with the seventh connecting port 70, the working medium flowing in from the eighth connecting port 80 exchanges heat with the working medium, which is flowing into the intermediate heat exchanger 5 from the heat exchange portion connecting port 84, in the intermediate heat exchanger 5, and then is merged with the working medium flowing through the cooler 6 at the second connecting port 40 and flows out of the intermediate heat exchanger 5, and the third group flows out from the third connecting port 50.

The first connecting port 30 and the tenth connecting port 120 are located in a cover body 31 of the liquid storage portion 3, the first connecting port 30 and the tenth connecting port 120 are configured as inlets of the liquid storage portion 3, and the liquid storage portion is fixedly connected to the connecting portion 8 through the cover body 31. In this embodiment, the liquid storage portion 3 has two inlets, which are respectively the first connecting port 30 and the tenth connecting port 120, and an outlet of the liquid storage portion 3 is in communication with the liquid storage portion connecting port 83 of the connecting portion 8.

The second connecting port 40, the third connecting port 50, the seventh connecting port 70 and the eighth connecting port 80 are located at a free end of the intermediate heat exchanger, the free end is defined with respect to a connecting end of the cooler 6, the second connecting port 40, the third connecting port 50, the seventh connecting port 70 and the eighth connecting port 80 are arranged in line; the second connecting port 40 and the third connecting port 50 are configured as outlets, the seventh connecting port 70 is configured as an inlet, and the eighth connecting port 80 is configured as an outlet. The ninth connecting port 110 is in communication with a connecting passage of the connecting portion 8. Specifically, the thermal management assembly further includes a block cap 1100, the block cap 1100 is fixedly connected to the connecting portion 8, the ninth connecting port 110 is located in the block cap 1100, or in other words, the connecting portion 8 further includes a block cap 1100, the block cap 1100 is a portion of the connecting portion 8, and the ninth connecting port 110 is located in the connecting portion 8. In this embodiment, the thermal management assembly does not include the sixth connecting port, that is, one inlet is reduced, the corresponding system circuit can be directly led back to the compressor without flowing through the thermal management assembly, which has a simple structure and simplifies the flow passage.

When the thermal management assembly 1010 in this embodiment is in operation, the working medium flows into the first duct 801 of the connecting portion from the fourth connecting port 10, flows out of the connecting portion 8 through the fifth connecting port 20 and the ninth connecting port 110, and flows into the liquid storage portion 3 through the first connecting port 20 and the tenth connecting port 120. The outlet of the liquid storage portion 3 is in communication with the liquid storage portion connecting port 83 of the connecting portion 8, the liquid storage portion connecting port 83 is in communication with the heat exchange portion connecting port 84 through the second transition passage 85, and the heat exchange portion connecting port 84 is in communication with the inner connecting bridge 506. The working medium can flow into the intermediate heat exchanger 5, the working medium flowing into the intermediate heat exchanger from the heat exchange portion connecting port 84 is divided into a first group, a second group and a third group, the first group flows into the cooler 6 from the throttle element 61, the working medium of the second group is in communication with the seventh connecting port 70, the working medium flowing in from the eighth connecting port 80 exchanges heat with the working medium, which is flowing into the intermediate heat exchanger from the heat exchange portion connecting port 84, in the intermediate heat exchanger 5, and then is merged with the working medium flowing through the cooler 6 at the second connecting port 40 and flows out of the intermediate heat exchanger 5, and the third group flows out from the third connecting port 50. In this embodiment, the liquid storage portion 3, the second connecting port 40, the third connecting port 50, the seventh connecting port 70 and the eighth connecting port 80 are located at the same free end of the intermediate heat exchanger 5, the connecting portion 8, the first valve portion 11 and the second valve portion 12 are all located on a top of the plate heat exchange assembly 56, the components in the thermal management assembly are arranged in an orderly sequence, which can effectively utilize the space, reasonably arrange the form of the flow passage, and reduce the flow resistance. In addition, since the second connecting port 40, the third connecting port 50, the seventh connecting port 70 and the eighth connecting port 80 are located at the same free end of the intermediate heat exchanger 5 and the first connecting port 30 and the tenth connecting port 80 are located in the cover body 31 of the liquid storage portion 3, the connecting ports are arranged in pairs, and only one connecting screw 78 is needed to connect the two connecting ports, which is beneficial to simplifying the assembly process of assembling the thermal management assembly in the system.

FIGS. 6 to 9 are schematic views of a second embodiment of the thermal management assembly. The thermal management assembly 1020 has a fourth connecting port 10, a fifth connecting port 20, a first connecting port 30, a second connecting port 40, a third connecting port 50, a sixth connecting port 60, a seventh connecting port 70, an eighth connecting port 80, a ninth connecting port 110 and a tenth connecting port 120. The thermal management assembly 1020 includes a first valve portion 11, a second valve portion 12, a liquid storage portion 3, a plate heat exchange assembly 56 and a connecting portion 8, the plate heat exchange assembly 56 includes an intermediate heat exchanger 5, a cooler 6 and an inner connecting bridge 506, and the connecting portion 8 has a first duct 801, a second duct 802 (not shown in the figure) and a third duct 803. In this embodiment, the second duct and the third duct 803 have the same structure but different orientations, at least part of the first valve portion 11 is located in the first duct 801, the fourth connecting port 10 is in communication with the fifth connecting port 20 through the first duct, the first connecting port 30 is in communication with an inlet of the liquid storage portion 3 through the second duct, the tenth connecting port 120 is in communication with another inlet of the liquid storage portion 3 through the third duct 803, and the fourth connecting port 10 is located on the connecting portion 8. In this embodiment, the connecting portion 8 is processed by a profile. In order to reduce the weight, the connecting portion has a hollow portion 9, and the hollow portion 19 is located between adjacent ducts. In this embodiment, the thermal management assembly includes a first block cap 805 and a second block cap 806, the first block cap 805 is fixedly connected to the connecting portion 8, the second block cap 806 is fixedly connected to the connecting portion 8, the fifth connecting port 20 and the first connecting port 30 are located in the first block cap 805, and the ninth connecting port 110 and the tenth connecting port 120 are located in the second block cap 806.

In this embodiment, the connecting portion 8 forms a cover body of the liquid storage portion, an outlet of the liquid storage portion is a liquid storage portion connecting port 83, a heat exchange portion connecting port 84 is located in a protruding connecting part of the connecting portion, the heat exchange portion connecting port 84 is in communication with the inner connecting bridge, the working medium can flow into the intermediate heat exchanger, the working medium flowing into the intermediate heat exchanger 5 from the heat exchange portion connecting port 84 is divided into a first group, a second group and a third group, the first group flows into the cooler 6 from the throttle element 61, the working medium of the second group is in communication with the seventh connecting port 70, the working medium flowing in from the eighth connecting port 80 exchanges heat with the working medium, which is flowing into the intermediate heat exchanger 5 from the heat exchange portion connecting port 84, in the intermediate heat exchanger 5, and then is merged with the working medium flowing through the cooler and the working medium flowing in through the sixth port 60 at the second connecting port 40 and flows out of the intermediate heat exchanger, and the third group is in communication with the third connecting port 50. In this embodiment, the second connecting port 40, the third connecting port 50, the sixth connecting port 60, the seventh connecting port 70 and the eighth connecting port 80 are located at the same free end of the intermediate heat exchanger 5, the liquid storage portion 3, the connecting portion 8, the first valve portion 11 and the second valve portion 12 are all located on the side of the plate heat exchange assembly 56, and the components in the thermal management assembly are arranged in an orderly sequence, which can effectively utilize the space, reasonably arrange the form of the flow passage, and reduce the flow resistance. In addition, the third connecting port 50, the sixth connecting port 60, the seventh connecting port 70 and the eighth connecting port 80 are located at the same free end of the intermediate heat exchanger 5, the fifth connecting port 20 and the first connecting port 30 are located on one side of the connecting portion 8, and the ninth connecting port 110 and the tenth connecting port 120 are located on the other side of the connecting portion 8, so that the connecting ports are arranged in pairs, the third connecting port and the sixth connecting port are located on a mounting seat, the mounting seat is located on the intermediate heat exchanger, and only one connecting screw 78 is needed to connect the two connecting ports, which is beneficial to simplifying the assembly process of assembling the thermal management assembly in the system.

FIGS. 10 to 12, and FIG. 23 are schematic views of a third embodiment of the thermal management assembly, the thermal management assembly 1030 has a fourth connecting port 10, a fifth connecting port 20, a first connecting port 30, a second connecting port 40, a third connecting port 50, a sixth connecting port 60, a seventh connecting port 70, an eighth connecting port 80, a ninth connecting port 110 and a tenth connecting port 120. The thermal management assembly 1030 includes a first valve portion 11, a second valve portion 12, a liquid storage portion (no shown in the figure, which is the same with that in FIG. 19), a plate heat exchange assembly 56 and a connecting portion 8, the plate heat exchange assembly 56 includes an intermediate heat exchanger 5, a cooler 6, an inner connecting bridge 506 and an outer connecting bridge 92, at least part of the first valve portion 11 is located in a first duct 801, the fourth connecting port 10 is in communication with the fifth connecting port 20 through the first duct 801, the first connecting port 30 is in communication with an inlet of the liquid storage portion through a second duct, the tenth connecting port 120 is in communication with another inlet of the liquid storage portion through a third duct 803, the fourth connecting port 10, the fifth connecting port 20, the first connecting port 30, the second connecting port 40, the ninth connecting port 110 and the tenth connecting port 120 are located in the connecting portion 8, the connecting portion 8 has a liquid storage portion connecting port 83 and a heat exchange portion connecting port 84, an outlet of the liquid storage portion is in communication with the liquid storage portion connecting port 83, and the heat exchange portion connecting port 84 is in communication with an inlet of the plate heat exchange assembly 56. The connecting portion 8 includes a main body portion 86 and a cantilever portion 87, and a right angle is formed between the main body portion 86 and the cantilever portion 87. In this embodiment, the main body portion 86 and the cantilever portion 87 together form an L-shape, the liquid storage portion connecting port 83 is located in the main body portion 86, the heat exchange portion connecting port 84 is located on an inner side of the cantilever portion 87, the connecting portion has a connecting duct 88, the liquid storage portion connecting port 83 is in communication with the heat exchange portion connecting port 84 through the connecting duct 88; the outer connecting bridge 92 is located on an outer side of the intermediate heat exchanger 5, the intermediate heat exchanger 5 is in communication with the cooler 6 through the inner connecting bridge 506, the inlet of the plate heat exchange assembly 56 is located in the outer connecting bridge 92, and an inlet of the intermediate heat exchanger 5 is in communication with the heat exchange portion connecting port 84 through the outer connecting bridge 92. In this embodiment, the thermal management assembly further includes a first valve assembly 7, a first inlet of the first valve assembly 7 and a first outlet of the first valve assembly 7 are in communication with the plate heat exchange assembly 56, a second inlet of the first valve assembly is in communication with the eighth connecting port 80 or a second inlet of the first valve assembly forms the eighth connecting port 80, a second outlet of the first valve assembly is in communication with the seventh connecting port 70 or a second outlet of the first valve assembly 7 forms the seventh connecting port 70, the first valve assembly includes a throttle element and a check valve, the throttle element is located between the first inlet and the second outlet of the first valve assembly, and the check valve is located between the second inlet and the first outlet of the first valve assembly.

In this embodiment, when the thermal management assembly is in operation, the working medium flows into the connecting portion 8 from the fourth connecting port 10, flows out of the connecting portion 8 through the fifth connecting port 20 and the ninth connecting port 110, and flows into the liquid storage portion through the first connecting port 30 and the tenth connecting port 120. The outlet of the liquid storage portion is in communication with the liquid storage portion connecting port 83 of the connecting portion, the liquid storage portion connecting port 83 is in communication with the heat exchange portion connecting port 84 through a second transition passage 85, and the heat exchange portion connecting port 84 is in communication with the outer connecting bridge 92. The working medium can flow into the intermediate heat exchanger 5, the working medium flowing into the intermediate heat exchanger from the heat exchange portion connecting port 84 is divided into: a first group, a second group and a third group, the first group flows into the cooler 6 from the throttle element 61, the working medium of the second group is in communication with the seventh connecting port 70 through the first valve assembly 7, the working medium flowing in through the eighth connecting port 80, the sixth connecting port 60, and the first valve assembly 7 exchanges heat with the working medium, which is flowing into the intermediate heat exchanger from the heat exchange portion connecting port 84, in the intermediate heat exchanger 5, and then is merged with the working medium flowing through the cooler 6 at the second connecting port 40 and flows out of the intermediate heat exchanger, and the third group is in communication with the third connection port 50. The third connecting port 50, the sixth connecting port 60, the seventh connecting port 70, the eighth connecting port 80 and the first valve assembly 7 are located on the same free end of the intermediate heat exchanger, the liquid storage portion, the connecting portion 8, the first valve portion 11 and the second valve portion 12 are all located on the side of the plate heat exchange assembly 56, and the components in the thermal management assembly are arranged in an orderly sequence, which can effectively utilize the space, reasonably arrange the form of the flow passage, and reduce the flow resistance. The connecting ports are arranged in pairs, and only one connecting screw 78 is needed to connect the two connecting ports, which is beneficial to simplifying the assembly process of assembling the thermal management assembly in the system.

FIGS. 13 to 16 are schematic views of a fourth embodiment of the thermal management assembly, and the main difference between the thermal management assembly 1040 and that in the third embodiment is that: the plate heat exchange assembly 56 includes an intermediate heat exchanger 5, a cooler 6 and an outer connecting bridge 92, the outer connecting bridge 92 is located on an outer side of the intermediate heat exchanger 5, the intermediate heat exchanger 5 is in communication with the cooler 6, an inlet of the plate heat exchange assembly 56 is located in the outer connecting bridge 92, the inlet of the intermediate heat exchanger 5 is in communication with the heat exchange portion connecting port 84 through the outer connecting bridge 92; the connecting portion 8 has a connecting pipe 89, the liquid storage portion connecting port 83 is in communication with the heat exchange portion connecting port 84 through the connecting pipe 89, the connecting pipe 89 is fixedly connected to the main body portion 86 and the cantilever portion 87. Alternatively, a first transition passage 806 is formed between the heat exchange portion connecting port and the connecting pipe, the first transition passage 806 extends from a top of the cantilever portion to a side of the cantilever portion, the liquid storage portion connecting port is located on a top of the main body portion, the formation of the connecting portion is more convenient compared with that in the third embodiment, especially for the solution of processing the duct of the connecting portion by using a profile; the third connecting port 50 and the sixth connecting port 60 are located on a mounting seat, and the mounting seat 560 is located in and is fixedly connected to the outer connecting bridge 92.

FIGS. 17 to 20 are schematic views of a fifth embodiment of the thermal management assembly, and the main difference between the thermal management assembly 1050 and that in the fourth embodiment is that: the thermal management assembly 1050 further includes a second valve assembly 4, the second valve assembly 4 includes a first valve body 41, a first valve core and a second valve core, the first valve body 41 has a first flow passage 411 and a second flow passage 412, the first valve core is located in the first flow passage 411, the second valve core is located in the second flow passage 412, the eleventh connecting port 90 is configured as a port formed by the first flow passage 411 in the first valve body 41, the twelfth connecting port 100 is configured as a port formed by the second flow passage 412 in the first valve body 41, a working medium flowing through the liquid storage portion can flow into the first flow passage 411 through the first inlet that is in communication with an outlet of the liquid storage portion, this part of working medium can be in communication with the plate heat exchange assembly or the eleventh connecting port 90 by controlling the first valve core to rotate, the working medium can flow into the second flow passage 412 from the twelfth connecting port 100, a second outlet, which is in communication with the heat exchange portion connecting port, is in communication with the plate heat exchange assembly through the second flow passage 412 by the second valve core. The second valve core is a check valve, and the first valve core is a three-way ball valve.

Figure 21:
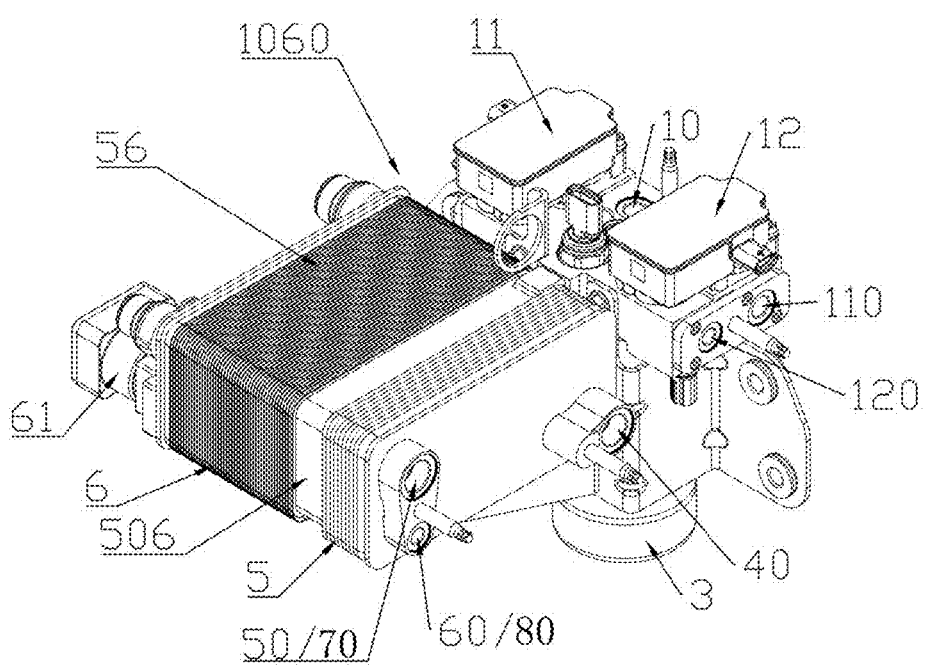
FIG. 21 is a schematic perspective view of a sixth embodiment of the thermal management assembly viewed from one perspective.

FIG. 21 is a schematic view of a sixth embodiment of the thermal management assembly, and the main difference between the thermal management assembly 1060 and that in the second embodiment is that: the second embodiment of the thermal management assembly includes two sets of connecting ports, which are the third connecting port 50 and the sixth connecting port 60, the seventh connecting port 70 and the eighth connecting port 80, the sixth embodiment of the thermal management assembly includes one of the above two sets of connecting ports, so that the working medium flowing into the intermediate heat exchanger is divided into: a first group and a second group, the first group flows into the cooler 6 through the throttle element 61, the working medium of the second group is in communication with the seventh connecting port 70 or the third connecting port 50, the working medium flowing in through the eighth connecting port 80 or the sixth connecting port 60 exchanges heat with the working medium, which is flowing into the intermediate heat exchanger from the heat exchange portion connecting port 84, in the intermediate heat exchanger 5, and then is merged with the working medium flowing through the cooler at the second connecting port 40 and flows out of the intermediate heat exchanger.

Figure 22:
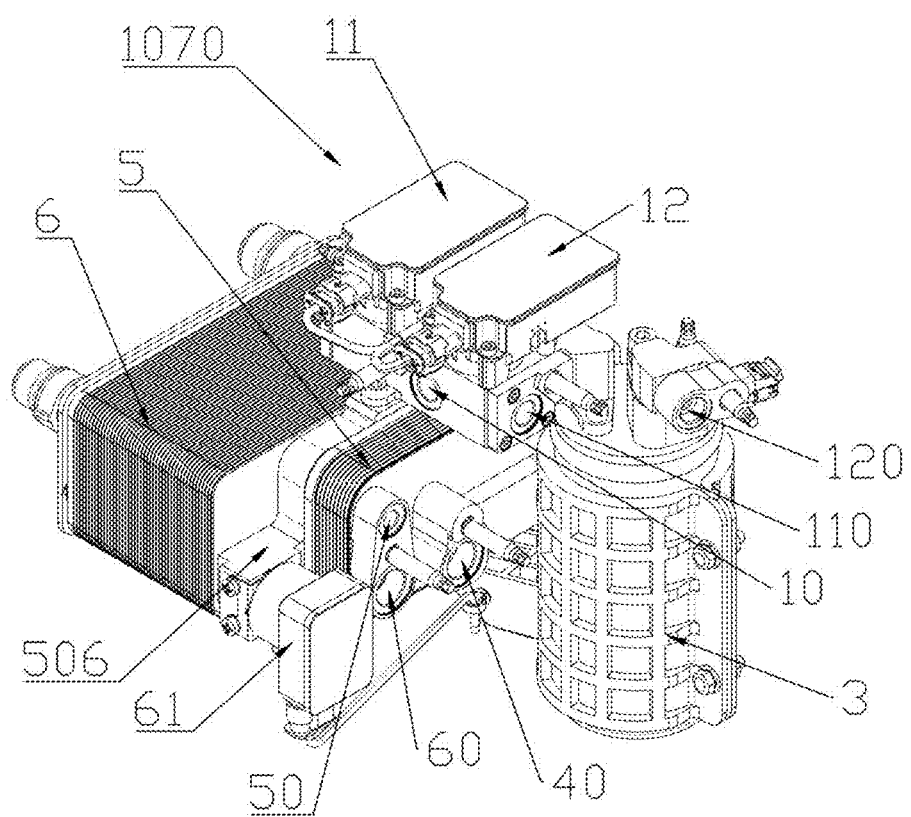
FIG. 22 is a schematic perspective view of the seventh embodiment of the thermal management assembly viewed from another perspective.
Figure 23:
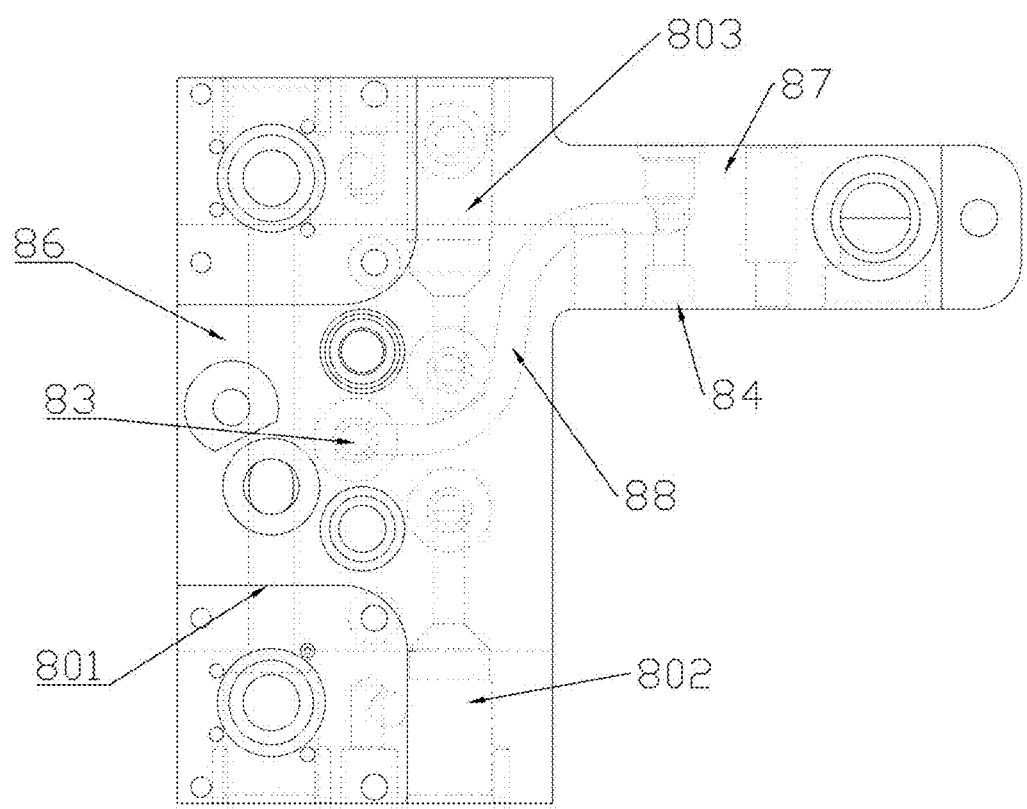
FIG. 23 is a schematic perspective view of the connecting portion in FIG. 22.

FIG. 22 is a schematic view of a seventh embodiment of the thermal management assembly, and the main difference between the thermal management assembly 1070 and the first embodiment of the thermal management assembly is that: in the first embodiment, the sizes of the intermediate heat exchanger 5 and the cooler 6 are the same in a length direction and a width direction, the throttle element 61 is located at the free end of the cooler 6. However, in this embodiment, since the size of the intermediate heat exchanger 5 is smaller than the size of the cooler 6, the inner connecting bridge 506 can expose the intermediate heat exchanger 5, and the throttle element 61 and the inner connecting bridge 506 are fixedly connected and can be sealed.

Referring to FIGS. 24 to 27, a thermal management assembly according to the present disclosure can be applied to a vehicular thermal management system, the thermal management assembly has a fourth connecting port 10, a fifth connecting port 20, a first connecting port 30, a second connecting port 40 and a third connecting port 50, the thermal management assembly includes a first valve portion 11, a liquid storage portion 3, an intermediate heat exchanger 5 and a cooler 6, the cooler has a refrigerant passage and a coolant passage, the intermediate heat exchanger can be in communication with the refrigerant passage; the first valve portion 11 is located between the fourth connecting port 10 and the fifth connecting port 20, the first connecting port 30 is in communication with a first inlet 31 of the liquid storage portion 3, and the intermediate heat exchanger 5 is located downstream of the liquid storage portion 3; the intermediate heat exchanger 5 is in communication with the second connecting port 40 and the third connecting port 50, and the second connecting port 40 and the third connecting port 50 are configured as outlets or the second connecting port 40 and the third connecting port 50 are configured as outlets of the intermediate heat exchanger.

The thermal management assembly may further include a sixth connecting port 60, a seventh connecting port 70 and an eighth connecting port 80, the sixth connecting port is configured as an inlet of the intermediate heat exchanger 5, one outlet of the intermediate heat exchanger 5 is in communication with the seventh connecting port 70, and one inlet of the intermediate heat exchanger 5 is in communication with the eighth connecting port 80. Specifically, the thermal management assembly may further include a first valve assembly 7, a first inlet 701 of the first valve assembly 7 and a first outlet 702 of the first valve assembly 7 are in communication with the intermediate heat exchanger 5, a second inlet 703 of the first valve assembly 7 is in communication with the eighth connecting port 80 or a second inlet 703 of the first valve assembly 7 forms the eighth connecting port 80, and a second outlet 704 of the second valve assembly 7 is in communication with the seventh connecting port 70 or a second outlet 704 of the first valve assembly 7 forms the seventh connecting port 70. Alternatively, the first valve assembly 7 may not be provided, and the seventh connecting port 70 is in communication with one inlet of the intermediate heat exchanger 5 through a passage, or the seventh connecting port 70 is configured as an inlet of the intermediate heat exchanger 5, and the eighth connecting port 80 is in communication with the intermediate heat exchanger 5 through a passage or the eighth connecting port 80 is configured as an outlet of the intermediate heat exchanger 5.

The thermal management assembly may further include a second valve assembly 4, the second valve assembly 4 is located between the liquid storage portion 3 and the intermediate heat exchanger 5, an outlet 32 of the liquid storage portion 3 is in communication with a first inlet 401 of the second valve assembly 4, a tenth connecting port 120 is in communication with a second inlet 402 of the second valve assembly 4 or a tenth connecting port 120 is configured as a second inlet of the second valve assembly 4, an eleventh connecting port 90 is in communication with a first outlet 403 of the second valve assembly 4 or the eleventh connecting port 90 is configured as a first outlet of the second valve assembly 4, and a second outlet 404 of the second valve assembly 4 is in communication with an inlet of the intermediate heat exchanger 5. The thermal management assembly may further include a second valve portion 12, the second valve portion 12 is located between the fourth connecting port 10 and a ninth connecting port 110, and a tenth connecting port 120 is in communication with the second inlet 33 of the liquid storage portion 3. Of course, the first valve portion and the second valve portion may not be provided if no pressure adjustment is needed.

Figure 24:
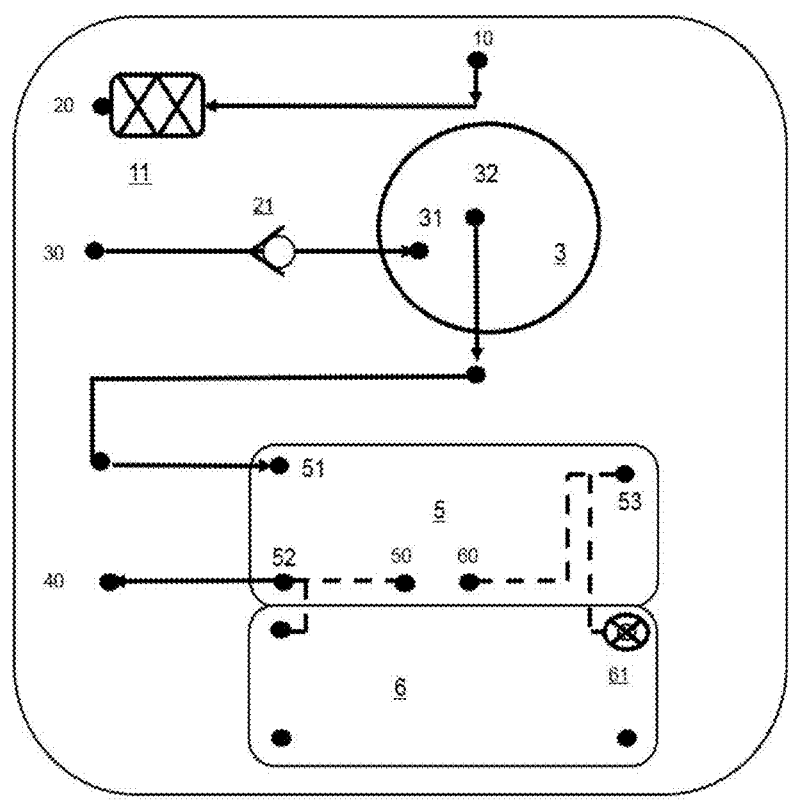
FIG. 24 is a schematic block diagram showing a connection of the first embodiment of the thermal management system.

The thermal management assembly according to the present disclosure can be applied to the vehicular thermal management system, the thermal management system may include a compressor, a condenser, an evaporator and the thermal management assembly, the fourth connecting port 10 of the thermal management assembly can be in communication with an outlet of the compressor, the second connecting port of the thermal management assembly can be in communication with an inlet of the compressor, the fifth connecting port of the thermal management assembly is in communication with an inlet of the condenser, the first connecting port can be in communication with an outlet of the condenser, the sixth connecting port can be in communication with an outlet of the evaporator, and the third connecting port can be in communication with an inlet of the evaporator. Of course, the system may further include a second evaporator, the seventh connecting port 70 is in communication with an inlet of the second evaporator, and the eighth connecting port 80 is in communication with an outlet of the evaporator. The system may further include a subcooler, the ninth connecting port 110 is in communication with an inlet of the subcooler, and the tenth connecting port 120 is in communication with an outlet of the subcooler. The system may further include a second condenser, the eleventh connecting port 90 is in communication with an inlet of the second condenser, and the twelfth connecting port is in communication with an outlet of the second condenser. The above vehicular thermal management system may be a new energy vehicular thermal management system, including a pure electric vehicular thermal management system. When the thermal management assembly in FIG. 24 is in operation, the working medium can flow in from the fourth connecting port 10, flows out of the thermal management assembly through the fifth connecting port 20, and flows into the liquid storage portion 3 from the first connecting port 30; the outlet 33 of the liquid storage portion 3 is in communication with the intermediate heat exchanger 5, the working medium can flow into the intermediate heat exchanger 5, the working medium flowing into the intermediate heat exchanger is divided into: a first group, a second group and a third path, the first group flows into the cooler 6 from the throttle element 61, the working medium of the second group is in communication with the seventh connecting port 70, the working medium flowing in through the eighth connecting port 80 exchanges heat with the working medium, which is flowing into the intermediate heat exchanger from the outlet of the liquid storage portion, in the intermediate heat exchanger 5, and then is merged with the working medium flowing through the cooler 6 at the second connecting port 40 and flows out of the intermediate heat exchanger 5, and the third group is in communication with the third connection port 50. The components in the thermal management assembly are arranged in an orderly sequence, which can effectively utilize the space, reasonably arrange the form of the flow passage, and reduce the flow resistance.

Figure 25:
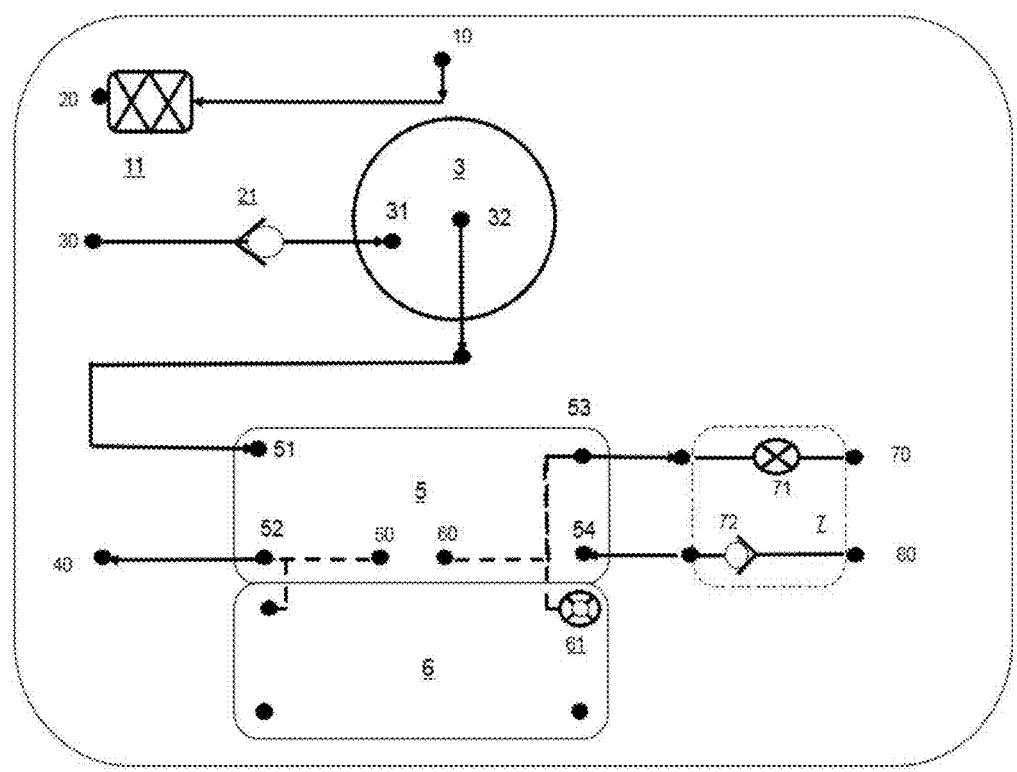
FIG. 25 is a schematic block diagram showing a connection of the second embodiment of the thermal management system.

When the thermal management system in FIG. 25 is in operation, the working medium can flow in from the fourth connecting port 10, flow out of the thermal management assembly through the fifth connecting port 20, and flow into the liquid storage portion 3 from the first connecting port 30; the outlet 33 of the liquid storage portion 3 is in communication with the intermediate heat exchanger 5, the working medium can flow into the intermediate heat exchanger 5, the working medium flowing into the intermediate heat exchanger is divided into: a first group, a second group and a third path, the first group flows into the cooler 6 from the throttle element 61, the working medium of the second group is in communication with the second outlet 704 of the first valve assembly 7, the second outlet 704 of the first valve assembly 7 forms the seventh connecting port 70, the second inlet 703 of the first valve assembly 7 is in communication with the eighth connecting port 80 or the second inlet 703 of the first valve assembly 7 forms the eighth connecting port 80, the working medium flowing in through the eighth connecting port 80 exchanges heat with the working medium, which is flowing into the intermediate heat exchanger from the outlet of the liquid storage portion, in the intermediate heat exchanger 5, and then is merged with the working medium flowing through the cooler 6 at the second connecting port 40 and flows out of the intermediate heat exchanger 5, and the third group is in communication with the third connection port 50.

Figure 26:
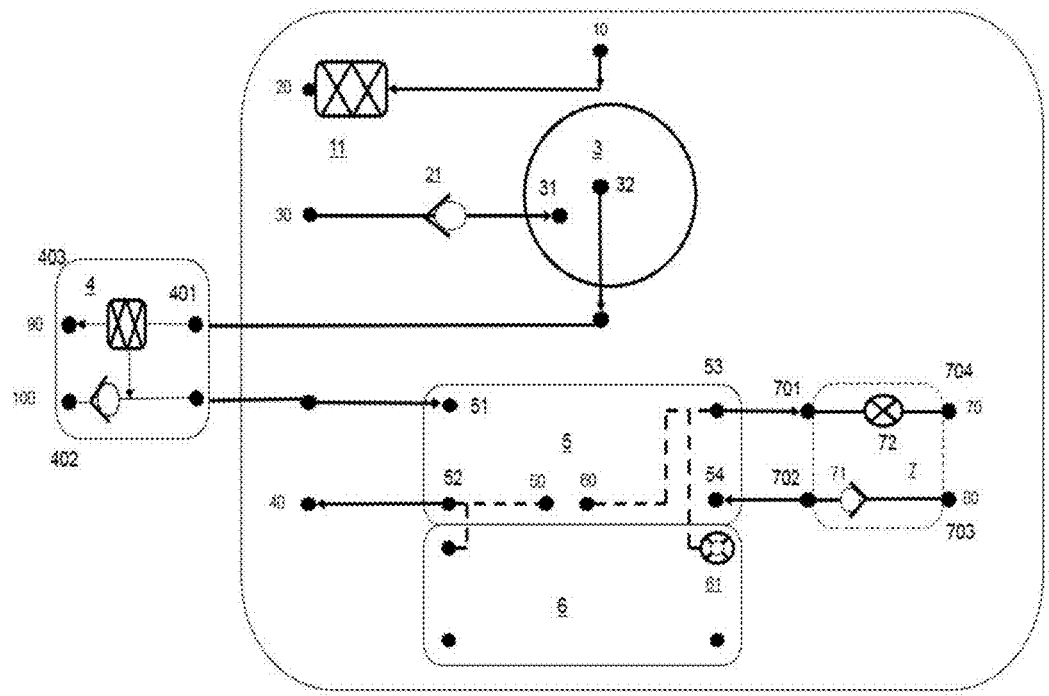
FIG. 26 is a schematic block diagram showing a connection of the third embodiment of the thermal management system.
Figure 27:
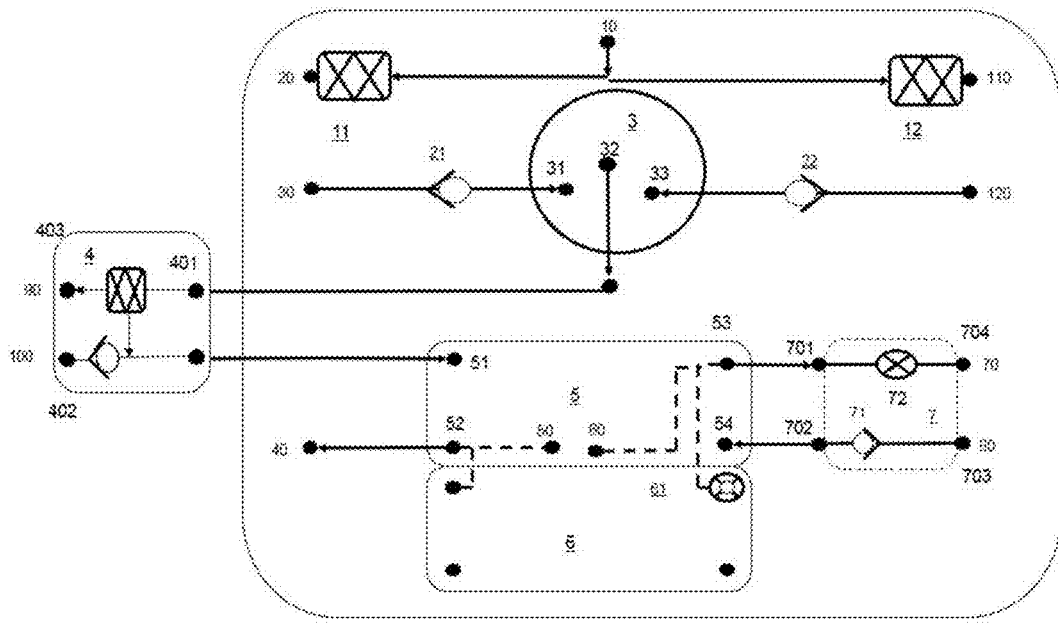
FIG. 27 is a schematic block diagram showing a connection of the fourth embodiment of the thermal management system.

When the thermal management system in FIG. 26 is in operation, the working medium can flow in from the fourth connecting port 10, flow out of the thermal management assembly through the fifth connecting port 20, and flow into the liquid storage portion 3 from the first connecting port 30; the outlet 32 of the liquid storage portion 3 is in communication with the first inlet 401 of the second valve assembly 4, the tenth connecting port 120 is in communication with the second inlet 402 of the second valve assembly 4 or the tenth connecting port 120 is configured as the second inlet of the second valve assembly 4, the ninth connecting port 110 is in communication with the first outlet of the second valve assembly 4 or the ninth connecting port 90 is configured as the first outlet of the second valve assembly 4, the second outlet 404 of the second valve assembly 4 is in communication with the inlet of the intermediate heat exchanger 5, the working medium flowing into the intermediate heat exchanger is divided into: a first group, a second group and a third path, the first group flows into the cooler 6 from the throttle element 61, the working medium of the second group is in communication with the second outlet 704 of the first valve assembly 7, the second outlet 704 of the first valve assembly 7 forms the seventh connecting port 70, the second inlet 703 of the first valve assembly 7 is in communication with the eighth connecting port 80 or the second inlet 703 of the first valve assembly 7 forms the eighth connecting port 80, the working medium flowing in through the eighth connecting port 80 exchanges heat with the working medium, which is flowing into the intermediate heat exchanger from the outlet of the liquid storage portion, in the intermediate heat exchanger 5, and then is merged with the working medium flowing through the cooler 6 at the second connecting port 40 and flows out of the intermediate heat exchanger 5, and the third group is in communication with the third connection port 50.

When the thermal management assembly in FIG. 26 is in operation, the working medium can flow in from the fourth connecting port 10, and flow out of the thermal management assembly through the fifth connecting port 20 and the eleventh connecting port 110; the first valve portion 11 is provided between the fourth connecting port 10 and the fifth connecting port 20, the second valve portion 12 is provided between the fourth connecting port 10 and the eleventh connecting port 110, a first check valve 21 is provided between the first connecting port 30 and a first inlet 31 of the outlet of the liquid reservoir, a second check valve 22 is provided between the twelfth connecting port 120 and a second inlet 33 of the outlet of the liquid reservoir; the working medium flows into the liquid storage portion 3 through the first connecting port 30 and the twelfth connecting port 120, the outlet 32 of the liquid storage portion 3 is in communication with the first inlet 401 of the second valve assembly 4, the tenth connecting port 120 is in communication with the second inlet 402 of the second valve assembly 4 or the tenth connecting port 120 is configured as the second inlet of the first valve assembly 4, the ninth connecting port 110 is in communication with the first outlet 403 of the first valve assembly 4 or the ninth connecting port 110 is configured as the first outlet of the second valve assembly 4, and the second outlet 404 of the second valve assembly 4 is in communication with the inlet of the intermediate heat exchanger 5, the working medium flowing into the intermediate heat exchanger is divided into: a first group, a second group and a third path, the first group flows into the cooler 6 from the throttle element 61, the working medium of the second group is in communication with the second outlet 704 of the first valve assembly 7, the second outlet 704 of the first valve assembly 7 forms the seventh connecting port 70, the second inlet 703 of the first valve assembly 7 is in communication with the eighth connecting port 80 or the second inlet 703 of the first valve assembly 7 forms the eighth connecting port 80, the working medium flowing in through the eighth connecting port 80 exchanges heat with the working medium, which is flowing into the intermediate heat exchanger from the outlet of the liquid storage portion, in the intermediate heat exchanger 5, and then is merged with the working medium flowing through the cooler 6 at the second connecting port 40 and flows out of the intermediate heat exchanger 5, and the third group is in communication with the third connection port 50.

It should be noted that, the above embodiments are only intended to illustrate the present disclosure and not to limit the technical solutions described in the present disclosure. Although the present specification has been described in detail with reference to the embodiments described above, it should be understood by those skilled in the art that, various modifications and equivalents can be made to the technical solutions of the present disclosure without departing from the spirit and scope of the present disclosure, all of which should be contained within the scope of the claims of the present disclosure.

The invention claimed is:

1. A thermal management assembly comprising a first connecting port, a second connecting port and a third connecting port,
    wherein the thermal management assembly further comprises a liquid storage portion, a plate heat exchange assembly, and a connecting portion,
    wherein the first connecting port is configured as one inlet of the liquid storage portion, the plate heat exchange assembly is located downstream of the liquid storage portion, and the plate heat exchange assembly is in communication with the second connecting port and the third connecting port,
    wherein the second connecting port and the third connecting port are configured as outlets of the plate heat exchange assembly,
    wherein the connecting portion is provided with a liquid storage portion connecting port, a heat exchange portion connecting port, and a transition passage,
    wherein the liquid storage portion connecting port is in communication with the heat exchange portion connecting port through the transition passage, an outlet of the liquid storage portion is in communication with the liquid storage portion connecting port, and the heat exchange portion connecting port is in communication with an inlet of the plate heat exchange assembly,
    wherein the plate heat exchange assembly comprises an intermediate heat exchanger, a cooler and an inner connecting bridge, wherein the inner connecting bridge is located between the intermediate heat exchanger and the cooler, the inlet of the plate heat exchange assembly is located in the inner connecting bridge, and the heat exchange portion connecting port is in communication with an inlet of the intermediate heat exchanger through the inner connecting bridge,
    wherein the cooler comprises a refrigerant passage and a coolant passage, and the intermediate heat exchanger is in communication with the refrigerant passage of the cooler.

2. The thermal management assembly according to claim 1, wherein the intermediate heat exchanger is located downstream of the liquid storage portion, the intermediate heat exchanger is in communication with the second connecting port and the third connecting port, respectively, the second connecting port and the third connecting port are configured as outlets or the second connecting port and the third connecting port are configured as outlets of the intermediate heat exchanger.

3. The thermal management assembly according to claim 2, wherein the thermal management assembly further comprises a fourth connecting port and a fifth connecting port, the fourth connecting port is able to be in communication with the fifth connecting port, the fourth connecting port is configured as one inlet, and the fifth connecting port is configured as one outlet.

4. The thermal management assembly according to claim 1, wherein the thermal management assembly further comprises a fourth connecting port and a fifth connecting port, the fourth connecting port is able to be in communication with the fifth connecting port, the fourth connecting port is configured as one inlet, and the fifth connecting port is configured as one outlet.

5. The thermal management assembly according to claim 4, wherein the thermal management assembly further comprises a sixth connecting port, the sixth connecting port is in communication with an inlet of the intermediate heat exchanger, or the sixth connecting port is configured as one inlet of the intermediate heat exchanger.

6. The thermal management assembly according to claim 5, wherein the thermal management assembly further comprises a seventh connecting port and an eighth connecting port, one outlet of the intermediate heat exchanger is in communication with the seventh connecting port or the seventh connecting port is configured as one outlet of the intermediate heat exchanger, and one inlet of the intermediate heat exchanger is in communication with the eighth connecting port or the eighth connecting port is configured as one inlet of the intermediate heat exchanger.

7. The thermal management assembly according to claim 6, wherein the thermal management assembly further comprises a first valve assembly, a first inlet of the first valve assembly and a first outlet of the first valve assembly are in communication with the intermediate heat exchanger, a second inlet of the first valve assembly is in communication with the eighth connecting port or a second inlet of the first valve assembly forms the eighth connecting port, a second outlet of the first valve assembly is in communication with the seventh connecting port or a second outlet of the first valve assembly forms the seventh connecting port, the first valve assembly comprises a throttle element and a check valve, the throttle element is located between the first inlet and the second outlet, and the check valve is located between the second inlet and the first outlet.

8. The thermal management assembly according to claim 7, wherein the thermal management assembly further comprises a ninth connecting port and a tenth connecting port, the ninth connecting port is configured as one outlet of the thermal management assembly, the tenth connecting port is configured as one inlet of the thermal management assembly, the ninth connecting port is able to be in communication with the fourth connecting port, and the tenth connecting port is able to be in communication with the inlet of the liquid storage portion.

9. The thermal management assembly according to claim 8, wherein the thermal management assembly further comprises a first valve portion and a second valve portion, the first valve portion is located between the fourth connecting port and the fifth connecting port, the first valve portion is configured to control the fourth connecting port to or not to be in communication with the fifth connecting port and control a flow rate between the fourth connecting port and the fifth connecting port, the second valve portion is located between the fourth connecting port and the ninth connecting port, the second valve portion is configured to control the fourth connecting port to or not to be in communication with the ninth connecting port and control a flow rate between the fourth connecting port and the ninth connecting port, and the tenth connecting port is able to be in communication with the inlet of the liquid storage portion; and the connecting portion is provided with a communication passage, the communication passage comprises a first duct, at least part of the first valve portion is located in the first duct, the fourth connecting port and the fifth connecting port are located in the connecting portion, and the fourth connecting port and the fifth connecting port are able to be in communication through the cooperation of the first valve portion and the first duct.

10. The thermal management assembly according to claim 9, wherein the connecting portion comprises a main body portion and a cantilever portion, the main body portion and the cantilever portion are arranged at a right angle, the liquid storage portion connecting port is located in the main body portion, the heat exchange portion connecting port is located in the cantilever portion, the first duct is located in the main body portion, wherein the thermal management assembly further comprises a connecting pipe, the connecting pipe is fixedly connected to the main body portion and the cantilever portion, the liquid storage portion connecting port is in communication with the heat exchange portion connecting port through the connecting pipe; or, the connecting portion is further provided with a connecting duct, and the liquid storage portion is in communication with the heat exchange portion connecting port through the connecting duct.

11. The thermal management assembly according to claim 10, wherein the plate heat exchange assembly comprises an outer connecting bridge, the outer connecting bridge is located on an outer side of the intermediate heat exchanger, the intermediate heat exchanger is in communication with the cooler, the inlet of the plate heat exchange assembly is located on the outer connecting bridge, and an inlet of the intermediate heat exchanger is in communication with the heat exchange portion connecting port through the outer connecting bridge.

12. The thermal management assembly according to claim 4, wherein the second connecting port is located in the connecting portion or the outer connecting bridge, the third connecting port and the sixth connecting port are located in a mounting seat, the connecting seat is located in the outer connecting bridge, the first valve assembly is fixedly connected to the outer connecting bridge, the second valve assembly comprises a second valve body, the seventh connecting port and the eighth connecting port are formed in the second valve body, the seventh connecting port is in communication with the intermediate heat exchanger through the throttle element, and the eighth connecting port is in communication with the intermediate heat exchanger through the check valve.

13. The thermal management assembly according to claim 12, wherein the first connecting port and the tenth connecting port are configure as inlets of the liquid storage portion, and the first connecting port and the tenth connecting port are located in a cover plate of the liquid storage portion;

or, the first connecting port and the tenth connecting port are configure as inlets of the liquid storage portion, the first connecting port and the tenth connecting port are located in the connecting portion, the communication passage is provided with a second duct and a third duct, the first connecting port is in communication with the inlet of the liquid storage portion through the second duct, and the tenth connecting port is in communication with the inlet of the liquid storage portion through the third duct.

14. The thermal management assembly according to claim 11, wherein the working medium of the intermediate heat exchanger is divided into a first group and a second group, the first group flows into the cooler after being throttled, the working medium of the second group is in communication with the seventh connecting port after being throttled by the first valve assembly, the working medium flowing in from the eighth connecting port exchanges heat with the working medium, which is flowing into the intermediate heat exchanger from the liquid storage portion, in the intermediate heat exchanger, and then is merged with the working medium flowing through the cooler at the second connecting port, and flows out of the intermediate heat exchanger.

15. The thermal management assembly according to claim 10, wherein the thermal management assembly further comprises an eleventh connecting port and a twelfth connecting port, the thermal management assembly further comprises a second valve assembly, the second valve assembly is located between the liquid storage portion and the intermediate heat exchanger, the outlet of the liquid storage portion is in communication with a first inlet of the second valve assembly, the twelfth connecting port is in communication with a second inlet of the second valve assembly or the twelfth connecting port is configured as a second inlet of the second valve assembly, the eleventh connecting port is in communication with a first outlet of the second valve assembly or the eleventh connecting port is configured as a first outlet of the second valve assembly, and a second outlet of the second valve assembly is in communication with the inlet of the intermediate heat exchanger; and the second valve assembly comprises a first valve body, a first valve core and a second valve core, the first valve body is provided with a first flow passage and a second flow passage, the first valve core is located in the first flow passage, the second valve core is located in the second flow passage, the eleventh connecting port is a port formed by the first flow passage in the first valve body, the twelfth connecting port is a port formed by the second flow passage on the first valve body, a working medium flowing through the liquid storage portion is able to flow into the first flow passage, this part of working medium is able to be in communication with the plate heat exchange assembly or the eleventh connecting port by controlling the first valve core to rotate, the working medium is able to flow into the second flow passage from the twelfth connecting port, the second flow passage is in communication with the plate heat exchange assembly through the second valve core, and the second valve core is a check valve.

16. The thermal management assembly according to claim 15, wherein the cantilever portion forms a first transition passage, and the second flow passage is in communication with the heat exchange portion connecting port through the first transition passage.

* * * * *